(12) United States Patent
Illingworth

(10) Patent No.: US 6,464,459 B2
(45) Date of Patent: Oct. 15, 2002

(54) LIFTING PLATFORM WITH ENERGY RECOVERY

(75) Inventor: Lewis Illingworth, Kensington, NH (US)

(73) Assignee: Avionic Instruments, Inc., Avenel, NJ (US)

( * ) Notice: Subject to any disclaimer, the term of this patent is extended or adjusted under 35 U.S.C. 154(b) by 0 days.

(21) Appl. No.: 09/871,597

(22) Filed: May 31, 2001

(65) Prior Publication Data

US 2002/0047071 A1 Apr. 25, 2002

Related U.S. Application Data

(63) Continuation-in-part of application No. 09/728,602, filed on Dec. 1, 2000, which is a continuation-in-part of application No. 09/316,318, filed on May 21, 1999.

(51) Int. Cl.[7] ............................... F01D 9/00; B60V 1/15
(52) U.S. Cl. ................. 415/208.2; 180/122; 415/211.2
(58) Field of Search ............................ 415/208.1, 208.2, 415/211.2, 220, 221, 224, 228; 244/12.1, 12.2, 12.4, 12.5, 23 R, 23 A, 23 C; 180/116, 119, 120, 122, 125, 129; 414/676

(56) References Cited

U.S. PATENT DOCUMENTS

| | | | | | |
|---|---|---|---|---|---|
| 3,150,732 | A | * | 9/1964 | Walker | 180/122 |
| 3,162,260 | A | * | 12/1964 | Cockerell | 180/122 |
| 3,168,155 | A | * | 2/1965 | Cockerell | 180/119 |
| 3,194,333 | A | * | 7/1965 | Cockerell | 180/122 |
| 3,249,165 | A | * | 5/1966 | Chaplin, Jr. | 180/122 |
| 3,262,510 | A | * | 7/1966 | Froehler | 180/117 |
| 3,279,553 | A | * | 10/1966 | Tinajero | 180/122 |
| 3,285,357 | A | * | 11/1966 | Beardsley | 180/122 |
| 3,288,235 | A | * | 11/1966 | Jones | 180/122 |
| 3,306,389 | A | * | 2/1967 | Tinajero | 180/122 |
| 3,363,716 | A | * | 1/1968 | Cockerell | 180/122 |

\* cited by examiner

*Primary Examiner*—John E. Ryznic
(74) *Attorney, Agent, or Firm*—Ward & Olivo

(57) ABSTRACT

A lifting platform is disclosed that utilizes means for energy recovery in order to maximize efficiency. Prior lifting platforms described by the inventor have utilized partial toroidal vortices in order to create a high pressure region below the platform. The present invention, however, improves on the prior lifting platforms by utilizing a complete toroidal vortex. Thus, a great deal of the energy expended is recovered by the recirculation of the fluid. The vortex fan must only supply the energy needed to overcome friction.

17 Claims, 12 Drawing Sheets

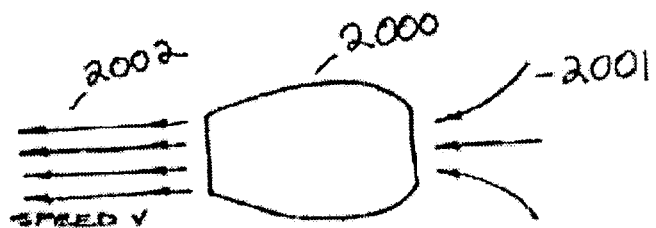
FIGURE 20. (Prior Art)
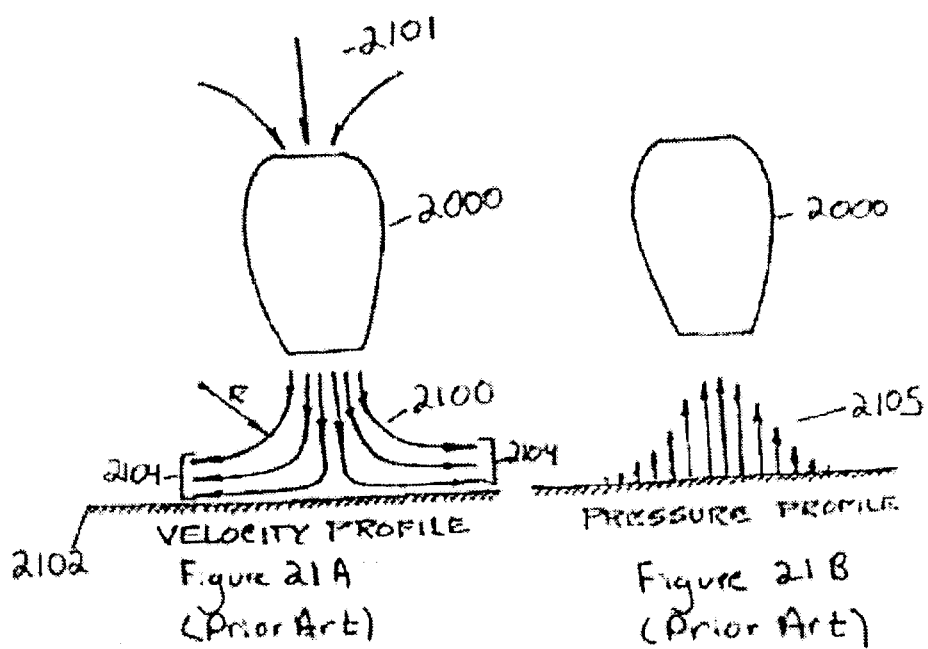
Figure 21A (Prior Art)
Figure 21B (Prior Art)

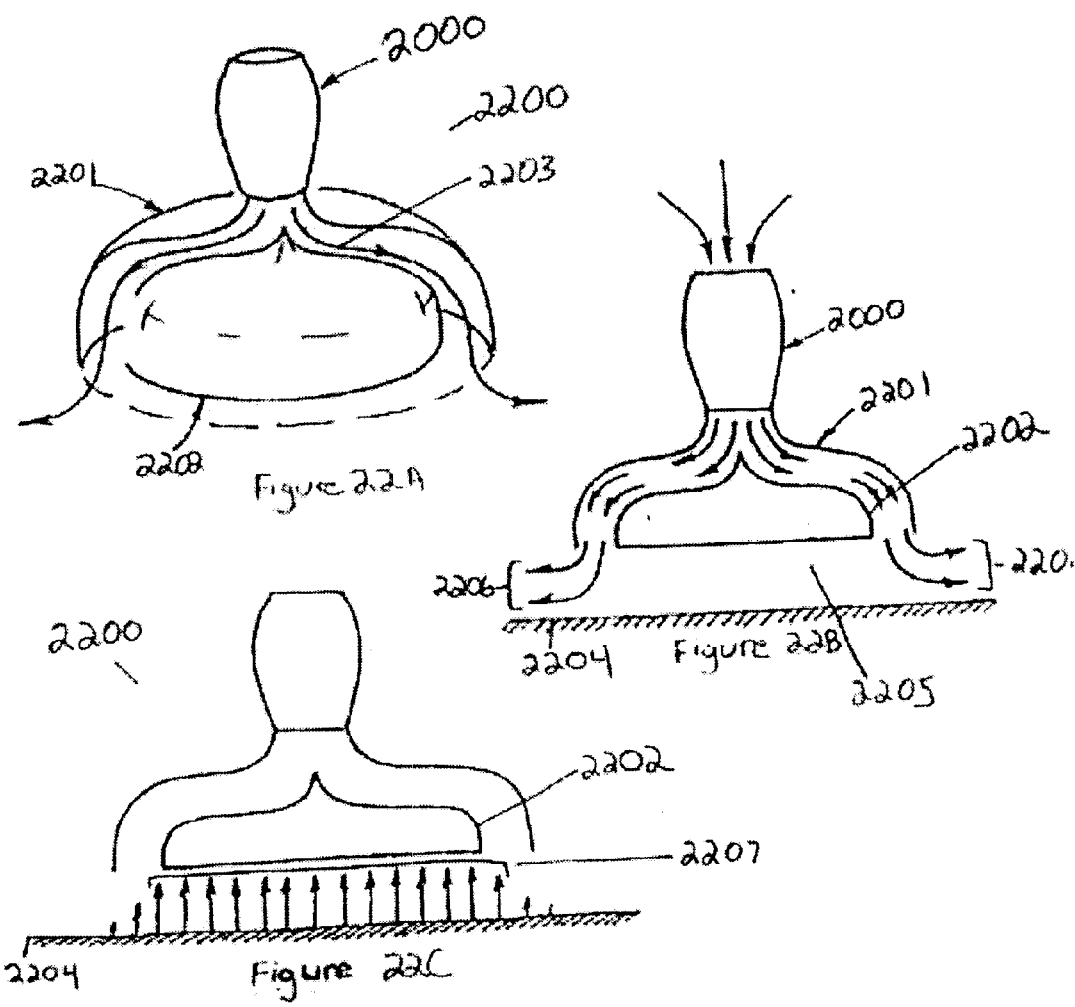

LIFTING PLATFORM WITH ENERGY RECOVERY

CROSS REFERENCE TO OTHER APPLICATIONS

This application is filed as a continuation-in-part of co-pending application Ser. No. 09/728,602, filed Dec. 1, 2000, entitled "Lifting Platform" which is a continuation-in-part of co-pending application Ser. No. 09/316,318, filed May 21, 1999, entitled "Vortex Attractor."

TECHNICAL FIELD OF THE INVENTION

The present invention relates initially, and thus generally, to lifting platforms. More specifically, the present invention relates to apparatus for improved performance of ground effect devices, e.g., hovercrafts, attractor devices and vertical take-off and landing (VTOL) devices. Furthermore, a lifting platform is provided that may also function as an attractor.

The present approach to a lifting platform differs in concept to the conventional hovercraft in that the elements of both hovercraft and helicopter are integrated into a single system. The characteristics of both are combined to provide, at one end of the range, a hovercraft that has the ability to rise over obstacles, and at the other extreme a free flying platform. In all cases the power requirements are optimized. When operating as a conventional hovercraft the power requirement is the same as that for an optimized hovercraft. When operating at a low altitude the power requirement is greater than that for a hovercraft operating close to the ground, but much less than that for a helicopter. When operating at altitude the power requirement is somewhat less than that for a helicopter.

The lifting platform design in accordance with the present invention represents a series of platforms specifically designed for operational altitude by incorporating various proportions of what may be termed "Helicopter" lift with "Hovercraft" lift.

These lifting platforms utilize a partial toroidal vortex to maintain a higher than atmospheric pressure beneath the platform. An embodiment is also disclosed that completes the vortex and thus retains much of the expended energy.

BACKGROUND OF THE INVENTION

It is contemplated that the present invention could relate to many possible fields. Initially, it is thought that the invention could apply to fields including, but in no way limited to, hovercrafts and other ground effect vehicles, vertical take-off and landing (VTOL) vehicles, turbine engines and vortex attractors.

Ground Effect Vehicles

In the most conventional sense, the means for any type of levitation has been dominated by a single lift mechanism: the wing. The wing yielded a mode of travel that was a substantial improvement in many ways over other ground-based modes of travel. However, in some applications, wings have some important shortcomings.

Some important shortcomings will be enumerated below:
a) The velocity asymmetries around the surfaces of wings are the basis for the lift they generate. When wings move through the air, they produce substantial drops in pressure at their upper and lower surfaces. The forces generated on the upper and the lower surfaces of the wing, however, point in opposite directions so that they almost completely cancel out.
b) Because wings have low lift factors they have to be large in order to generate a practical amount of lift. The large size of the wings causes them to create a lot of drag when they move through the air.
c) Winged aircraft have a fairly narrow range of speed that they work well in. In order to get off the ground they must have a much larger wing than they need after they have gained speed. The large wing needed to take off creates a lot of drag at high velocity. That makes if very hard to fly at supersonic or hypersonic speeds. Importantly, in regard to the present invention, it makes them very difficult to generate lift at low speeds.
d) Wings have to be moved at fairly high velocity in order to produce practical amounts of lift. That means that they have a lot of room to operate and that winged aircraft are dangerous to bystanders. That is true even for rotary winged craft (helicopters).
e) Wings waste a lot of energy because they shed powerful vortices into the passing air as they generate lift. The energy that goes into those vortices contributes nothing to the generation of lift by the wing.
f) Wings can suddenly stop producing lift. If a winged aircraft flies too slowly the wings stall and can cause a crash.
g) Wings can't produce lift when they are standing still. To make a craft that can hover while it is standing still, means that the wings must be incorporated into a mechanism that swings them through the air. That mechanism and the wing together is called a rotary wing mechanism. It is very complicated and requires a lot of maintenance to operate reliably.
h) Rotary wing mechanism is inefficient.
i) Rotary wing craft are complicated and thus require a lot of maintenance.
j) The rotary wing mechanisms operate asymmetrically when a helicopter moves forward through the air. Without a corrective mechanism the helicopter produces greater lift on one side than the other side. The forward sweeping wings would experience a much higher air velocity than an aft sweeping wing. An elaborate hinge system is able to correct some of those air flow asymmetries at low speed. However, there is no corrective mechanism that allows a helicopter to operate at speeds faster than 250 m.p.h.

Thus, to address certain of these concerns, e.g., the ability to efficiently and cost-effectively hover and traverse at speeds safe to surrounding persons, various types or designs of ground effect or air cushion devices have been developed over the years. Ground effect crafts, or "hovercrafts", are any of the machines characterized by movement in which a significant portion of the weight is supported by forces arising from air pressures developed around the craft, as a result of which they hover in close proximity to the Earth's surface. It is this proximity to the surface that chiefly distinguishes such craft from aircraft, which derive their lift from aerodynamic forces created by movement through the air.

Two main classes of air-cushion vehicles exist: those that generate their own pressure differential irrespective of forward speed; and those, more closely related to true aircraft, that require forward speed before the pressure differential can be generated. The former are classed as aerostatic craft (ACVs); the latter are called aerodynamic ground-effect machines (GEMs). Perhaps the first man to research the air-cushion vehicle concept was Sir John Thornycroft, a British engineer who, in the 1870s, began to build test models to check his theory that drag on a ship's hull could be reduced if the vessel were given a concave bottom in which air could be contained between hull and water. His patent of 1877 emphasized that "provided the air cushion could be carried along under the vehicle" the only power that the cushion would require would be that necessary to replace lost air. Neither Thornycroft nor other inventors in following decades succeeded in solving the cushion-containment problem. In the meantime, aviation developed and pilots early discovered that when they were flying very close to land or water surface their aircraft developed greater lift than in free air. Through research, it was soon determined that the greater lift was available because wing and ground together created a "funnel" effect, increasing the air pressure. The amount of additional pressure was found to be dependent on the design of the wing and its height above ground. The effect was strongest when the height was between one-half and one-third of the average wing chord.

Practical use was made of the ground effect in 1929 by the German Dornier Do X flying boat, which achieved a considerable gain in performance during an Atlantic crossing wherein it flew close to the sea surface. World War II maritime reconnaissance aircraft also made use of the phenomenon to extend their range.

In the 1960s, American aerodynamicists developed an experimental craft, making use of a wing in connection with ground effect. Several other proposals of this type were proffered, and a further variation combined the airfoil characteristics of a ground-effect machine with an air-cushion lift system that allowed the craft to develop its own hovering power while stationary, then build up forward speed, gradually transferring the lift component to its airfoil. Although none of these craft got beyond the experimental stage, they were important portents of the future because they suggested means of using the hovering advantage of the air-cushion vehicle and overcoming its theoretical speed limitation of around 200 miles per hour (320 kilometers per hour), above which it was difficult to hold the air cushion in place. These vehicles are known as ram-wing craft.

In the early 1950s, engineers in the United Kingdom, the United States, and Switzerland were seeking solutions to Sir John Thornycroft's 80-year-old problem. Christopher Cockerell of the United Kingdom is now acknowledged to have been the father of the Hovercraft, as the air-cushion vehicle is popularly known. During World War II he had been closely connected with the development of radar and other radio aids and had retired into peacetime life as a boatbuilder. Soon he began to concern himself with Thornycroft's problem of reducing the hydrodynamic drag on the hull of a boat with some kind of air lubrication.

Cockerell (later knighted) bypassed Thornycroft's plenum chamber (in effect, an empty box with an open bottom) principle, in which air is pumped directly into a cavity beneath the vessel, because of the difficulty in containing the cushion. He theorized that, if air were instead pumped under the vessel through a narrow slot running entirely around the circumference, the air would flow toward the center of the vessel, forming an external curtain that would effectively contain the cushion. This system is known as a peripheral jet. Once air has built up below the craft to a pressure equaling the craft weight, incoming air has nowhere to go but outward and experiences a sharp change of velocity on striking the surface. The momentum of the peripheral jet air keeps the cushion pressure and the ground clearance higher than it would be if air were pumped directly into a plenum chamber.

To test his theory, Cockerell set up an apparatus consisting of a blower that fed air into an inverted coffee tin through a hole in the base. The tin was suspended over the weighing pan of a pair of kitchen scales, and air blown into the tin forced the pan down against the mass of a number of weights. Hence, the forces involved were roughly measured. By securing a second tin within the first and directing air down through the space between, Cockerell was able to demonstrate that more than three times the number of weights could be raised by this means, compared with the plenum chamber effect of the single can.

Cockerell's first patent was filed on Dec. 12, 1955 (Great Britain Patent Application Ser. No. 35,656/55, and issued in the United States on Jan. 16, 1968 as U.S. Pat. No. 3,363,716 from Ser. No. 627,925, filed Dec. 12, 1956), and in the following year he formed a company known as Hovercraft Ltd. His early memoranda and reports show a prescient grasp of the problems involved in translating the theory into practice. Such problems still concerned designers of Hovercraft years later, and some of Cockerell's ideas have yet to be fully explored. He forecast, for example, that some kind of secondary suspension would be required in addition to the air cushion itself. Another of his ideas still to be developed deals with the recirculation of air in the peripheral jet so that part of it is used over and over, improving efficiency and reducing the power required.

Realizing that his discovery would not only make boats go faster but also would allow the development of amphibious craft, Cockerell approached the Ministry of Supply, the British government's defense-equipment procurement authority. The air-cushion vehicle was classified "secret" in November 1956, and a development contract was placed with a British aircraft and seaplane manufacturer. In 1959 the world's first practical ACV was launched. It was called the SR.N1.

Originally the SR.N1 had a total weight of four tons and could carry three men at a maximum speed of 25 knots (1 knot=1.15 miles or 1.85 kilometers per hour) over very calm water. Instead of having a completely solid structure to contain the cushion and peripheral jet, it incorporated a 6-inch- (15-centimeter-) deep skirt of rubberized fabric. This development provided a means whereby the air cushion could easily be contained despite unevenness of the ground or water. It was soon found that the skirt made it possible to revert once again to the plenum chamber as a cushion producer. Use of the skirt brought the problem of making skirts durable enough to withstand the friction wear produced at high speeds through water. It was thus necessary to develop the design and manufacturing skills that would allow skirts to be made in the optimum shape for aerodynamic efficiency.

Skirts of rubber and plastic mixtures, 4 feet deep, had been developed by early 1963, and the performance of the SR.N1 was increased by their use and further incorporating gas-turbine power to a payload of seven tons and a maximum speed of 50 knots.

The first crossing of the English Channel by the SR.N1 was in 1959, symbolically on the 50th anniversary of Louis Blériot's first flight across the same water. Manufacturers and operators in many parts of the world became interested. Manufacture began in the United States, Japan, Sweden, and France; and in Britain additional British companies were building crafts in the early 1960s.

In 1963 the first major variation of the basic air-cushion vehicle theme was produced in the form of sidewall craft. This was a nonamphibious vessel that had a solid hull down each side, with a plenum chamber beneath the hull sealed by flexible skirts at the bow and stem. In the displacement mode, the central hull section floated in the water with the sidewalls well submerged, but when air was pumped into the plenum chamber, the hull was raised above the water and the sidewalls themselves were submerged for only some 12 inches (30 centimeters), considerably reducing the hydrodynamic drag.

The sidewall ACV has several advantages over the amphibious craft, although its use is confined to water: first, water propellers can be used, allowing a much greater freedom of control, especially at low speeds; second, the sidewalls themselves give the craft better stability and reduce the problems that are inherent in all-round flexible skirts. In the early 1970s, sidewalls were once again in favor, especially among American manufacturers who saw a market for a high-speed marine freight carrier that would not need an amphibious capability.

The years 1962–64 were a peak period for worldwide interest in Hovercraft, but by the early 1970s only the British had produced what could truly be called a range of craft, and this against considerable odds. There were signs, however, that U.S., Soviet, and French manufacturers were seriously contemplating reentry into the field and that Australia and Japan also were becoming ACV-minded.

The stagnation of the intervening seven years can be explained by the failure of air-cushion vehicles to live up to what many people thought was their original promise. Cockerell and others had foreseen many of the difficulties, but some second-generation designers, builders, and, particularly, operators thought that the simple Hovercraft would be the answer to a variety of problems that at that stage of development were considerably beyond the scope of the craft available.

In the first place, amphibious craft generally needed to be air-propelled. Directional control was imprecise, precluding their use on highways. As already mentioned, the design of and materials used in flexible skirts had to be developed from the first, and not until 1965 was an efficient and economic flexible-skirt arrangement evolved, and even then the materials were still being developed.

Another major problem arose when aircraft gas-turbine engines were used in a marine environment. Although such engines, suitably modified, had been installed in ships with some success, their transition into Hovercraft brought out their extreme vulnerability to saltwater corrosion. By its very nature the air-cushion vehicle generates a great deal of spray when it is hovering over water, and the spray is drawn into the intakes of gas turbines in amounts not envisaged by the engine designer. Even after considerable filtering, the moisture and salt content is high enough to corrode large modern gas-turbine engines to such an extent that they need a daily wash with pure water and even then have a considerably reduced life span between overhauls.

The costs of engine overhauls and skirt maintenance and repairs have probably been the main factors retarding the advancement of air-cushion vehicles. Skirt development proceeded extremely rapidly in the first decade after SR.N1. Jet-engine corrosion may be solved by new materials or possibly by intake design to limit spray ingestion. In the meantime, some manufacturers are bypassing the gas-turbine difficulty by using high-speed marine diesel engines in multiple units. These are cheaper, more economical to run, and relatively free from corrosion problems but for a given power output are considerably heavier than their gas-turbine counterparts.

The history of the air-cushion vehicle principle also includes the use of air-cushion support in other applications, both for transportation and for support as such. These include air-cushion transporters, trains, and even beds.

The basic elements of an air-cushion vehicle are a hull, beneath which a skirt system is attached and on which accommodation for passengers, crew, and freight is built; a propulsion system; and a lift system that feeds air into the plenum chamber below the craft in order to provide a cushion. The propulsion and lift systems can be driven by the same power plant or by separate units. If a common power plant is used, the system is known as an integrated lift-propulsion system. Some early craft had only one airflow generating system, which was used for both lift and propulsion, but optimum efficiency for both requirements was difficult to achieve simultaneously, and separate systems are generally used.

The power-to-weight ratio is as critical at the design stage of an ACV as it is in an aircraft. In the ACV it determines not only the payload and performance of the craft but also the ground clearance between the surface and the skirt. The greater the ground clearance, the more efficiently the propulsion forces available can be used. Theoretical design operating weights are essential for comparison and evaluation purposes, but in practice it has been found that air-cushion vehicles can be overloaded by as much as 100 percent of the design payload and still operate.

To obtain the best power-to-weight-to-strength relationships, structural fabrication of air-cushion vehicles has been based more on aviation than on marine practices. Hull structures are of marine aluminum skin, welded or riveted onto aluminum webs or frames. The enclosed spaces are usually sealed so that the airtight compartments thus formed provide natural buoyancy. More recent craft have aluminum honeycomb paneling separated by frames to provide the basic buoyancy raft, and considerable areas of glass-fiber structure also have been incorporated.

Early crafts had a hole located near the center of the buoyancy raft through which air was fed to the plenum chamber beneath, but the development of the skirt and other techniques led to the ducting of fan air to the edge of the raft, where it was fed downward into the plenum chamber in the manner of a peripheral jet.

Skirts themselves have developed from a simple curtain designed to enclose the cushion into complicated geometric shapes that contain the cushion, duct the air, and, in some cases, provide a degree of secondary suspension. The simple curtain was quickly replaced by what is now known as a bag skirt. In the shape of a semicircle, this is fastened around the perimeter of the craft; the lower edge is taken inward and upward and is fastened inboard, below the hull. The inflated skirt forms a semicircular cross section. If air is fed through ducts in the top hull so that it inflates the skirt and then is allowed to escape through holes on the inside edge of the bag into the plenum area, the skirt acts as natural ducting, and by varying the size of the holes it is possible to vary the pressure ratio of bag inflation to plenum pressure.

The problem with bag skirts is that the lowest part of the bag quickly wears away, and the bag itself tears, allowing air to escape and releasing the cushion pressure. In 1965 it was decided to lengthen the bag skirt by suspending a curtain-type skirt from it. Instead of a straightforward curtain arrangement, the skirt was split into small segments, each of which acted independently from the others. This segmented, or finger-type, addition to the basic bag skirt became the version most commonly used because worn segments could be replaced quickly and economically and because the independent action of each finger allowed the whole skirt to conform much more closely to the operating surface beneath, reducing drag and air-cushion losses.

Materials used in the skirts have varied from the original rubberized fabric, through pure rubber and nylon, to a lamination of nylon and a proprietary plastic known as neoprene. Bondings between the different layers have to be especially strong; otherwise the fabric delaminates under the severe conditions of wear and loses its tear resistance.

Power plants used for air-cushion vehicles are generally gas-turbine engines; the output shaft is driven by a turbine that is not mechanically connected to the main compressor-turbine assembly. In this way the engine can be independent of the fan or propeller that it drives, and the free turbine will not begin to rotate until gas from the engine is allowed to pass over its vanes. This allows the craft to remain stationary and on the ground until the driver decides to move, even though the engines are delivering power. The fans used to provide air pressure for lift are usually of the centrifugal type, in which air is fed in through the center and driven out at considerably higher pressure around the circumference. Propellers are generally similar to those used for aircraft, although, because the air-cushion vehicles travel in the 0–60-knot speed range and can move in reverse, a standard aircraft propeller designed to operate best at higher speeds is inefficient. Hovercraft propellers can be fixed or mounted on swiveling pylons, which allow the craft to be maneuvered quite accurately, independently of the rudders on which fixed propellers rely. Rudder effectiveness depends to some extent on the forward speed of the craft, and at very low speeds rudders are not efficient as a means of turning.

Other propulsion methods that have been tried in the past include ducted fans, which are quieter than normal propellers but tend to be large and cumbersome. Sidewall craft can be propelled by water screws or by water jets.

Operations on which air-cushion vehicles have been used have been largely confined to commercial passenger-carrying ferry services across stretches of water, varying between 3 and 25 miles (5 to 40 kilometers) wide, and to certain military operations. Although scheduled services have been run for experimental periods in the United States, Canada, Sweden, and Italy, it is only in Britain and France that such services have survived longer than a season. By the early 1970s, a 170-ton car-carrying craft was so well established on routes across the English Channel that a considerable amount of traffic was being taken from sea ferries, and air services were virtually closed down.

Nonpassenger civil applications also have been found. Craft have been successfully used for seismic survey parties, either over shallow-water areas or in the desert, and in search-and-rescue operations from international airfields at Vancouver, B.C., Can., at Auckland, N.Z., and at San Francisco.

Military uses have been more diverse. The main British use has been as a troop carrier during amphibious assaults and as a logistics follow-up craft during the post-assault period. The United States Army used the Hovercraft successfully in actual operations in Vietnam, both as a patrol craft and as a means of covering the vast area of marsh and paddy field that surrounds the Mekong delta. Later military uses included mine-countermeasure work, antisubmarine work, aircraft carrying, and missile launching.

The mainstream of Hovercraft development as such has remained in Britain. Although U.S. firms built experimental craft in the mid-1960s, American interest declined as the pressure of the Vietnam War tended to encourage technologists to improve their established disciplines rather than develop new ones. Other countries also dropped out when the technical difficulties of skirts and the lift-propulsion system became too great for the financial or technical resources available.

The three British companies that pioneered ACV manufacturing merged their ACV interests in the 1960s into one company known as the British Hovercraft Corporation.

Cockerell's patent and other patents were taken up by a subsidiary of the National Research Development Corporation, a peculiarly British body set up to encourage the funding and backing of inventions. The subsidiary was known as Hovercraft Development Ltd., and, because of the patents that it held, it could control the manufacture of skirted air-cushion vehicles not only in Britain but in many other countries of the world.

The lineage along which ACVs developed was:

SR.N1 (1959) 3½ to 7 tons, single engine, ducted fan propulsion; speeds between 25 and 50 knots.

SR.N2 (1962) 19 tons, four engines driving two pylon-mounted air propellers; speed about 73 knots.

SR.N3 (1963) 37½ tons, four engines driving two pylon-mounted air propellers; speed about 75 knots.

SR.N5 (1964) 3½ tons, one engine driving a fixed, variable-pitch propeller; speed about 50 knots. Capacity, 18 passengers.

SR.N6 (1965) 4 ½ tons, one engine driving a fixed, variable-pitch propeller; speed about 60 knots. Capacity, 38 passengers.

SR.N4 (1968) 177 tons, four engines driving four pylon-mounted air propellers; speed 65 knots. Capacity, 30 cars and 254 passengers.

BH.7 (1969) 48 tons, one engine driving a pylon-mounted air propeller; speed about 65 knots. Capacity, 72 passengers and six cars (although the first three craft delivered were purely military versions).

These somewhat bare statistics suggest the burst of creative energy in the Hovercraft field in the early 1960s and the subsequent slowing down and rationalization of craft into practical machines. In the period between 1960 and 1964, some six other companies in the world also were building their own prototypes or large-scale models, but because of technology problems many of these were never followed up by production models.

The exceptions were in the Soviet Union and France. Little, however, is known about Soviet ACV development, except that after some five years of trials large passenger craft were operated on the Volga River in 1969 and that military craft were tested in the Black Sea in 1970.

A French company, formed in 1965, built two amphibious craft that, carrying up to 90 passengers, operated a commercial service based at Nice in 1969. The French designs are basically the same as any other amphibious craft with the major exception of the skirts, which are grouped together in a series of "mini-skirts" side-by-side along the length of the craft. Compartmentalizing the cushion in this way is said to improve stability and directional control. In the early 1970s it was announced that a larger craft, based on similar principles and carrying 32 cars and 260 passengers, would be put into production.

The development of nonamphibious Hovercraft along the sidewall principle began in 1962. For various reasons the manufacturer halted production, but the idea of a fast, essentially marine-oriented craft continued to appeal to designers, and a company known as Hovermarine was formed in 1965 to build a smaller sidewall craft, some 12 of which were sold. This is the HM.2, which carries about 65 passengers and is designed for short and medium ferry routes. Mechanical and skirt-design problems caused difficulties that led to liquidation of the British parent company, but in 1970 an American company took over the HM.2, and it appeared that its future would be assured. The basic advantage of sidewall craft is that, since they are purely marine, it is possible to equip them with marine propellers and operate them in the same way as high-speed boats. Nevertheless, because a great part of their weight when under way is supported by an air cushion, they can be classified as air-cushion machines.

It is along these lines (sidewall craft propelled by marine methods) that two American manufacturers have designed much larger craft under government contracts. The first versions are 100-ton test craft, which will be used to evaluate the potential of multithousand-ton surface effect ships. The two models are somewhat similar in appearance; both are powered by six gas turbines. One craft uses propellers, the other water-jet propulsion. Another U.S. military application, an amphibious assault landing craft for the navy, offers potential uses in commercial operations.

Once air-cushion suspension was proved practical in Hovercraft, the system was quickly applied to other forms of transport, and it soon became clear that a tracked vehicle, similar to a train or monorail, would benefit considerably from the lack of friction inherent in an air-cushion system. A French company was the first in the world to produce a practical device, and a later version of its machine was considered for a high-speed link between Orléans and Paris by the mid-1970s. The system used air-cushion pads above and at the side of a single concrete track to support the "aerotrain," while propulsion was via a large ducted fan mounted at the rear.

In Britain, tracked air-cushion vehicle development is also under way, with construction of a "Hovertrain," propelled by a relatively silent linear induction motor that has no moving parts and picks up current as it moves along the track.

Research also is proceeding in other countries. Air-cushion trains have speed potentials of up to 300 miles (480 kilometers) per hour; track costs are relatively low because of the simple concrete structure involved, which can be elevated on pylons, laid on the surface, or sunk in tunnels. Engineers in Britain, the United States, France, and Germany see this kind of high-speed surface transport as a means of connecting large urban centers with each other and with international airports.

The other major area in which air-cushion technology has proved itself useful is in moving loads over surfaces that would be impossible for wheeled or tracked vehicles. One of the first of these applications was an air-cushion amphibious military vehicle. Another example was an air-cushion truck built in France. Air-cushion load lifters for specialized applications were already in regular use in the early 1970s. One of the first was a British heavy-load carrier, designed specifically for the transport of large electrical transformers over bridges that were not stressed for the weights involved when normal wheeled transport was used. The transformers, weighing up to 300 tons, must be transported by road from the factory to the often remote power-station site. The costs of strengthening bridges sufficiently to take the load are far higher than those of fitting a special skirt and air-blower system to a conventional truck.

Similar systems on smaller scales have been developed for transport of many types of unusual loads over awkward ground. Particularly, they find application in the Arctic regions, where roads are often lacking and where oil-drill rigs are being constructed or where surveying is being carried out. Air-cushion vehicles have shown a large economic advantage over helicopters.

On an even smaller scale, air-cushion pallets are used in many industries in the United States and Britain to carry heavy loads across factory floors or along production lines. Again the main benefit is the reducing of strain on floors and the ease of propulsion with reduced friction.

One unique form of air suspension may be employed in hospitals. The Hover-bed is a device on which a patient is supported with the minimum of body contact and surface pressure. The bed is being tested by the British Medical Research Council and is expected to be of particular use in cases in which the patient is burned over a large area of the body. Air support in such cases not only relieves pressure and pain but also provides a film of sterile air that actually helps to heal the wound.

Yet another application promises to be that of recreation. In the mid-1960s enthusiasts in many parts of the world began to build their own Hovercraft, powered by automotive engines and using homemade propellers, fans, and skirts. By the 1970s Hover clubs existed in more than seven countries. The movement is probably most active in Britain, followed by the United States and Australia. Of the several hundred amateur-built craft, a few were capable of operating successfully over both land and water with more than one person aboard. Although power plants and other equipment are readily adaptable, the problem of providing sufficient lift was considerable. A craft capable of lifting 200 pounds (90 kilograms) needs a cushion area of 8×4 feet (2.4×1.2 meters). When weights of 1,000 pounds are involved, the area must be much greater. Another inhibiting factor in the sport's growth is the restrictions in most countries on operating air-cushion craft in public areas.

Air-cushion vehicles have not yet fulfilled their original promise. Conventional skirted craft have not yet been shown to be completely economical in commercial use, although in certain military applications they are almost ideal. The ram-wing craft described earlier shows promise for over-water routes.

One area of research in which manufacturers began concentrating in the 1970s is that of secondary suspension systems to iron out skirt undulations and possibly reduce spray ingestion.

Thus, there is a need for an improved hovercraft. In particular, a hovercraft comprising an efficient single airflow generating system which provides both lift and propulsion means is desirable for many applications.

Vertical Take-off and Landing Vehicles (VTOL)

Vertical Take Off and Landing (VTOL) are those aircraft with one or more power-driven horizontal propellers or rotors that enable it to take off and land vertically, to move in any direction, or to remain stationary in the air. Other vertical-flight craft include autogiros, convertiplanes, and V/STOL aircraft of a number of configurations.

The idea of taking off vertically, making the transition to horizontal flight to the destination, and landing vertically has been for centuries the dream of inventors. It is the most logical form of flight, dispensing as it does with large landing fields located far from city centers and the inevitable intervening modes of travel—automobile, subway, bus—that flight in conventional aircraft usually requires. But vertical flight is also the most demanding challenge in flying, requiring more sophistication in structure, power, and control than conventional fixed-wing aircraft. These difficulties, solved over time by determined engineers and inventors, made the progress of vertical flight seem slow compared to that of conventional flight, for the first useful helicopters did not appear until the early 1940s.

One important characteristic of the history of vertical flight is the pervasive human interest in the subject; inventors in many countries took up the challenge over the years, achieving varying degrees of success. The history of vertical flight began at least as early as about AD 400; there are historical references to a Chinese kite that used a rotary wing as a source of lift. Toys using the principle of the helicopter—a rotary blade turned by the pull of a string—were known during the Middle Ages. During the latter part of the 15th century, Leonardo da Vinci made drawings of a helicopter that used a spiral airscrew to obtain lift. A toy helicopter, using rotors made out of the feathers of birds, was presented to the French Academy of Science in 1784 by two artisans, Launoy and Bienvenu; this toy forecast a more successful model created in 1870 by Alphonse Pénaud in France.

The first scientific exposition of the principles that ultimately led to the successful helicopter came in 1843 from Sir George Cayley, who is also regarded by many as the father of fixed-wing flight. From that point on, a veritable gene pool of helicopter ideas was spawned by numerous inventors, almost entirely in model or sketch form. Many were technical dead ends, but others contributed a portion of the ultimate solution. In 1907 there were two significant steps forward. On September 29, the Breguet brothers, Louis and Jacques, under the guidance of the physiologist and aviation pioneer Charles Richet made a short flight in their Gyroplane No. 1, powered by a 45-horsepower engine. The Gyroplane had a spiderweb-like frame and four sets of rotors. The piloted aircraft lifted from the ground to a height of about two feet, but it was tethered and not under any control. Breguet went on to become a famous name in French aviation, and in time Louis returned to successful work in helicopters. Later, in November, their countryman Paul Cornu, who was a bicycle maker like the Wright brothers, attained a free flight of about 20 seconds' duration, reaching a height of one foot in a twin-rotor craft powered by a 24-horsepower engine. Another man who, like the Breguets, would flirt with the helicopter, and go on to make his name with fixed-wing aircraft, and then later return to the challenge of vertical flight, was Igor Sikorsky, who made some unsuccessful experiments at about the same time.

The next 25 years were characterized by two main trends in vertical flight. One was the wide spread of minor successes with helicopters; the second was the appearance and apparent success of the autogyro (a.k.a., autogyro).

The helicopter saw incremental success in many countries, and the following short review will highlight only those whose contributions were ultimately found in successfully developed helicopters. In 1912 the Danish inventor Jacob Ellehammer made short hops in a helicopter that featured contrarotating rotors and cyclic pitch control, the latter an important insight into the problem of control. On Dec. 18, 1922, a complex helicopter designed by George de Bothezat for the U.S. Army Air Force lifted off the ground for slightly less than two minutes, under minimum control. In France on May 4, 1924, Étienne Oehmichen established a distance record for helicopters by flying a circle of a kilometer's length.

In Spain in the previous year, on Jan. 9, 1923, Juan de la Cierva made the first successful flight of an autogiro. An autogiro operates on a different principle than a helicopter. Its rotor is not powered but obtains lift by its mechanical rotation as the autogiro moves forward through the air. It has the advantage of a relatively short takeoff and a near vertical descent, and the subsequent success of Cierva's autogiros and those of his competitors seemed to cast a pall on the future of helicopter development. Autogiros were rapidly improved and were manufactured in several countries, seeming to fill such a useful niche that they temporarily overshadowed the helicopter. Ironically, however, the technology of the rotor head and rotor blade developed for the autogiro contributed importantly to the development of the successful helicopter, which in time made the autogiro obsolete.

In 1936 Germany stepped to the forefront of helicopter development with the Focke Achgelis Fa 61, which had two three-bladed rotors mounted on outriggers and powered by a 160-horsepower radial engine. The Fa 61 had controllable cyclic pitch and set numerous records, including, in 1938, an altitude flight of 11,243 feet and a cross-country flight of 143 miles. In 1938 the German aviator Hanna Reitsch became the world's first female helicopter pilot by flying the Fa 61 inside the Deutschland-Halle in Berlin. It was both a technical and a propaganda triumph. Germany continued its helicopter development during World War II and was the first to place a helicopter, the Flettner Kolibri, into mass production.

In the United States, after many successes with commercial flying boats, Igor Sikorsky turned his attention to helicopters once again, and after a long period of development he made a successful series of test flights of his VS-300 in 1939–41. Essentially a test aircraft designed for easy and rapid modification, the VS-300 was small (weighing 1,092 pounds) and was powered by a 65-horsepower Lycoming engine. Yet it possessed the features that characterize most modem helicopters: a single main three-bladed rotor, with collective pitch, and a tail rotor. As successful as the VS-300 was, however, it also clearly showed the difficulties that all subsequent helicopters would experience in the development process. For many years, compared with conventional aircraft, helicopters were underpowered, difficult to control, and subject to much higher dynamic stresses that caused material and equipment failures. Yet the VS-300 led to a long line of Sikorsky helicopters, and it influenced their development in a number of countries, including France, England, Germany, and Japan.

After World War II the commercial use of helicopters developed rapidly in many roles, including fire fighting, police work, agricultural crop spraying, mosquito control, medical evacuation, and carrying mail and passengers.

The expanding market brought additional competitors into the field, each with different approaches to the problem of vertical flight. The Bell Aircraft Corporation, under the leadership of Arthur Young, began its long, distinguished history of vertical-flight aircraft with a series of prototypes that led to the Bell Model 47, one of the most significant helicopters of all time, incorporating an articulated, gyro-stabilized, two-blade rotor. Frank Piasecki created the Piasecki Helicopter Corporation; its designs featured a tandem-rotor concept. The use of twin tandem rotors enabled helicopters to grow to almost twice their previous size without the difficulty of creating very large rotor blades. In addition, the placement of the twin rotors provided a large center of gravity range. The competition was international, with rapid progress made in the Soviet Union, the United Kingdom, France, Italy, and elsewhere.

To an even greater extent than fixed-wing aircraft, the development of the helicopter had been limited by engine power. Reciprocating engines were heavy, noisy, and less efficient at high altitude. The first application of jet-engine technology to the helicopter was accomplished in 1951 by the Kaman Aircraft Corporation's HTK-1, which had Kaman's patented aerodynamic servo-controlled rotors in the "synchropter" configuration (i.e., side-by-side rotors with intermeshing paths of blade travel).

In conventional aircraft the power of the jet engine was used primarily for increased speed. In the helicopter the thrust of the jet turbine had to be captured by a gearbox that would turn the rotor. The jet engine had many advantages for the helicopter—it was smaller, weighed less than a piston engine of comparable power, had far less vibration, and used less expensive fuel. The French SNCA-S.E. 3130 Alouette II made its first flight on Mar. 12, 1955, powered by a Turbomeca Artouste II turbine engine. It rapidly became one of the most influential helicopters in the world and started a trend toward jet-powered helicopters everywhere.

There are now a vast number of helicopter types available on the market, ranging from small two-person private helicopters through large passenger-carrying types to work vehicles capable of carrying huge loads to remote places. All of them respond to the basic principles of flight, but, because of the unique nature of the helicopter's rotor and control systems, the techniques for flying them differ. There are other types of vertical-lift aircraft, whose controls and techniques are often a blend of the conventional aircraft and the helicopter. They form a small part of the total picture of flight but are of growing importance.

The autogiro was for many years the most reasonable alternative to the helicopter as a means of vertical flight. Because the rotor is not powered, the autogiro does not have to contend with torque (the tendency of the aircraft to turn in the opposite direction of the rotor) and thus avoided many of the control problems that impeded the development of the helicopter. The autogiro's rotor is designed so that a blade set at a low positive angle of pitch will rotate automatically as long as an airstream is kept flowing through the rotor (autorotation). As the autogiro is propelled forward through the air, with a stream of air flowing upward through its rotor, lift is generated. Control is effected in part through a universal joint at the rotor head, which tilts the blades creating a force that pulls the autogiro in the direction of the tilt. An elevator and rudder are maintained within the propeller slipstream for additional control. While prospects for commercial development of the autogiro evaporated with the success of the helicopter, sport autogiros known as "gyroplanes" became very popular.

Powered-lift aircraft can change the direction of their propulsion system's thrust in flight. They characteristically have the airframe and propulsion system closely integrated so that the propulsion system exhaust flow influences the aerodynamics of the airframe. They encompass a number of types; among the most successful are the vectored jet, the externally blown wing, and the externally blown flap.

The most successful of all the alternatives to the helicopter is one of the most technically complex, the vectored jet, best exemplified by the Harrier, developed initially by Hawker Aircraft and brought to maturity by British Aerospace and McDonnell Douglas. In the vectored jet, nozzles are designed to rotate so that the thrust can be applied vertically for takeoff and then moved to a horizontal position for conventional flight.

In an externally blown wing system, the exhaust from the jet engines is directed over the upper surface of the wing (and in some cases over the outer surface of the flap area. Exhaust from the jet engines in the externally blown flap vehicle is directed against a large flap extension surface.

Alternate types of vertical-takeoff aircraft include convertiplanes. There are two types of V/STOL (vertical- or short-takeoff-and-landing) aircraft that may alternate between vertical takeoff and conventional horizontal flight. These are convertible rotorcraft and convertible airplanes.

The first group consists of two types, the most important of which is the tilt-rotor aircraft, such as the Bell/Boeing V-22, in which a helicopter rotor is tilted vertically for vertical lift and horizontally for ordinary flight. The V-22 stemmed from more than three decades of development, which began with the Bell XV-3 in the early 1950s. It represents a configuration offering the greatest promise for intercity air transportation, combining the utility of the helicopter with speeds approaching that of turboprop transports. The second type is the less frequently found compound helicopter, which has driven rotors and uses both an additional power source and an additional means of generating aerodynamic lift.

The second group, convertible airplanes with propellers, has four basic configurations. The first of these are the deflected thrust type, in which large propellers exert thrust against a wing deflected into a broad arc. The second type is the tilt wing. In these aircraft, the wing is rotated to point the propellers vertically for takeoff and landing, then adjusted for horizontal flight by bringing the wing to a normal angle of attack. The third is the tilt duct, in which propellers shrouded in ducts are rotated from one flight mode to the other. The fourth is the tilt propeller, perhaps the least successful of the group. The Curtiss-Wright Corporation built the X-100 test-bed, which was successful enough to allow the building of the more advanced but ill-fated X-19 prototype that crashed during testing.

A number of attempts have been made to use the power of jet engines to lift an aircraft vertically from the ground and then shift to forward flight, but in every case the difficulties involved in recovery have inhibited the program. An early example, the Ryan X-13 Vertijet, was launched from a trailer bed that was erected vertically prior to takeoff. The aircraft flew successfully in vertical and horizontal modes, including takeoff and "tail-sitter" landings, but the operational limitations in terms of speed, range, and payload were too great for further development. The Ryan XV-5A Vertifan used a jet engine to drive horizontally mounted fans in the nose and wing; it was nominally successful. Another type of fixed jet used separate batteries of jet engines, some dedicated to vertical flight and some to horizontal flight, but this expensive technology was ultimately rejected.

Over time there have been a host of miscellaneous attempts at vertical flight. These include propeller-driven tail-sitters, dusted disc platforms, ground-effect aircraft (Hovercraft (tm)), and deflected jet thrust. In most cases, the advantages sought were offset by the difficulties encountered, and the tilt rotor, the vectored jet, and especially the helicopter have remained the most successful means to vertical flight.

Unlike fixed-wing aircraft, the helicopter's main airfoil is the rotating blade assembly (rotor) mounted atop its fuselage on a hinged shaft (mast) connected with the vehicle's engine and flight controls. In comparison to airplanes, the tail of a helicopter is somewhat elongated and the rudder smaller; the tail is fitted with a small antitorque rotor (tail rotor). The landing gear sometimes consists of a pair of skids rather than wheel assemblies.

The fact that the helicopter obtains its lifting power by means of a rotating airfoil (the rotor) greatly complicates the factors affecting its flight, for not only does the rotor turn but it also moves up and down in a flapping motion and is affected by the horizontal or vertical movement of the helicopter itself. Unlike the usual aircraft airfoils, helicopter rotor airfoils are usually symmetrical. The chord line of a rotor, like the chord line of a wing, is an imaginary line drawn from the leading edge to the trailing edge of the airfoil. The relative wind is the direction of the wind in relation to the airfoil. In an airplane, the flight path of the wing is fixed in relation to its forward flight; in a helicopter, the flight path of the rotor advances forward (to the helicopter's nose) and then rearward (to the helicopter's tail) in the process of its circular movement. Relative wind is always considered to be in parallel and opposite direction to the flight path. In considering helicopter flight, the relative wind can be affected by the rotation of the blades, the horizontal movement of the helicopter, the flapping of the rotor blades, and wind speed and direction. In flight, the relative wind is a combination of the rotation of the rotor blade and the movement of the helicopter.

Like a propeller, the rotor has a pitch angle, which is the angle between the horizontal plane of rotation of the rotor disc and the chord line of the airfoil. The pilot uses the collective and cyclic pitch control (see below) to vary this pitch angle. In a fixed-wing aircraft, the angle of attack (the angle of the wing in relation to the relative wind) is important in determining lift. The same is true in a helicopter, where the angle of attack is the angle at which the relative wind meets the chord line of the rotor blade.

Angle of attack and pitch angle are two distinct conditions. Varying the pitch angle of a rotor blade changes its angle of attack and hence its lift. A higher pitch angle (up to the point of stall) will increase lift; a lower pitch angle will decrease it. Individual blades of a rotor have their pitch angles adjusted individually.

Rotor speed also controls lift—the higher the revolutions per minute (rpm), the higher the lift. However, the pilot will generally attempt to maintain a constant rotor rpm and will change the lift force by varying the angle of attack.

As with fixed-wing aircraft, air density (the result of air temperature, humidity, and pressure) affects helicopter performance. The higher the density, the more lift will be generated; the lower the density, the less lift will be generated. Just as in fixed-wing aircraft, a change in lift also results in a change in drag. When lift is increased by enlarging the angle of pitch and thus the angle of attack, drag will increase and slow down the rotor rpm. Additional power will then be required to sustain a desired rpm. Thus, while a helicopter is affected like a conventional aircraft by the forces of lift, thrust, weight, and drag, its mode of flight induces additional effects.

In a helicopter, the total lift and thrust forces generated by the rotor are exerted perpendicular to its plane of rotation. When a helicopter hovers in a windless condition, the plane of rotation of the rotor (the tip-path plane) is parallel to the ground, and the sum of the weight and drag forces are exactly balanced by the sum of the thrust and lift forces. In vertical flight, the components of weight and drag are combined in a single vector that is directed straight down; the components of lift and thrust are combined in a single vector that is directed straight up. To achieve forward flight in a helicopter, the plane of rotation of the rotor is tipped forward. (It should be understood that the helicopter's rotor mast does not tip but rather the individual rotor blades within the plane of rotation have their pitch angle varied.) For sideward flight, the plane of the rotation of the rotor is tilted in the direction desired. For rearward flight, the plane of the rotation of the rotor is tilted rearward.

Because the rotor is powered, there is an equal and opposite torque reaction, which tends to rotate the fuselage in a direction opposite to the rotor. This torque is offset by the tail rotor (antitorque rotor) located at the end of the fuselage. The pilot controls the thrust of the tail rotor by means of foot pedals, neutralizing torque as required.

There are other forces acting upon a helicopter not found in a conventional aircraft. These include the gyroscopic precession effect of the rotor—that is, the dissymmetry of lift created by the forward movement of the helicopter, resulting in the advancing blade having more lift and the retreating blade less. This occurs because the advancing blade has a combined speed of the blade velocity and the speed of the helicopter in forward flight, while the retreating blade has the difference between the blade velocity and the speed of the helicopter. This difference in speed causes a difference in lift—the advancing blade is moving faster and hence is generating more lift. If uncontrolled, this would result in the helicopter rolling. However, the difference in lift is compensated for by the blade flapping and by cyclic feathering (changing the angle of pitch). Because the blades are attached to a rotor hub by horizontal flapping hinges, which permit their movement in a vertical plane, the advancing blade flaps up, decreasing its angle of attack, while the retreating blade flaps down, increasing its angle of attack. This combination of effects equalizes the lift. (Blades also are attached to the hub by a vertical hinge, which permits each blade to move back and forth in the plane of rotation. The vertical hinge dampens out vibration and absorbs the effect of acceleration or deceleration.) In addition, in forward flight, the position of the cyclic pitch control causes a similar effect, contributing to the equalization of lift.

Other forces acting upon helicopters include coning, the upward bending effect on blades caused by centrifugal force; Coriolis effect, the acceleration or deceleration of the blades caused by the flapping movement bringing them closer to (acceleration) or farther away from (deceleration) the axis of rotation; and drift, the tendency of the tail rotor thrust to move the helicopter in hover.

A helicopter has four controls: collective pitch control, throttle control, antitorque control, and cyclic pitch control.

The collective pitch control is usually found at the pilot's left hand; it is a lever that moves up and down to change the pitch angle of the main rotor blades. Raising or lowering the pitch control increases or decreases the pitch angle on all blades by the same amount. An increase in the pitch angle will increase the angle of attack, causing both lift and drag to increase and causing the rpm of the rotor and the engine to decrease. The reverse happens with a decrease in pitch angle.

Because it is necessary to keep rotor rpm as constant as possible, the collective pitch control is linked to the throttle to automatically increase power when the pitch lever is raised and decrease it when the pitch lever is lowered. The collective pitch control thus acts as the primary control both for altitude and for power.

The throttle control is used in conjunction with the collective pitch control and is an integral part of its assembly. The throttle control is twisted outboard to increase rotor rpm and inboard to decrease rpm.

The antitorque controls are pedals linked to operate a pitch change mechanism in the tail rotor gearbox. A change in pedal position changes the pitch angle of the tail rotor to offset torque. As torque varies with every change of flight condition, the pilot is required to change pedal position accordingly. The antitorque control does not control the direction of flight.

It was stated above that the lift/thrust force is always perpendicular to the plane of rotation of the rotor. The cyclic pitch control, a stick-type control found to the pilot's right, controls the direction of flight by tipping the plane of rotation in the desired direction. The term cyclic derives from the sequential way each blade's pitch is changed so that it takes the flight path necessary to effect the change in direction.

The most immediate and obvious difference in the construction of a fixed-wing aircraft and a helicopter is of course the latter's use of a rotor instead of a wing. There are many other critical additions, however, including the use of a tail rotor to offset torque. (Some helicopters use a "no tail rotor"

system, in which low-pressure air is circulated through a tail boom to control the torque of the spinning main rotor.) Less obvious are such additions as the transmission system, which is used to transfer power from the engine to the rotor, tail rotor, and other accessories; the clutch, used to engage the engine and transmission with the rotor; and the mechanics of the rotor system itself.

The first helicopters were quite primitive, with skids instead of wheeled landing gear, open cockpits, and unaired fuselage sections. Helicopters are now as fully equipped as airplanes, with retractable landing gear and full instrumentation and navigation equipment, and are provided with whatever accoutrements may be necessary to accomplish the specific task at hand. For example, some helicopters are flying ambulances, especially equipped with a complete set of intensive-care accessories. Others function as electronic news gatherers, with appropriate sensors and telecommunications equipment.

The design and operation of helicopters have derived the same advances from computers and composites as have other aircraft, especially in the design and construction of the rotor blades. One of the more important improvements is in the simplification of flight-control systems, where a simple side stick controller, with the assistance of computers, performs the functions of the collective, cyclic, and throttle controls.

Helicopter designs have included a number of optional rotor configurations, such as rotors that stop to serve as a fixed wing for forward flight; rotors that fold in a streamwise direction to blend in with, or be stowed within, the fuselage contours, lift being provided by a stub wing; and X-shaped rotors that rotate for takeoff and landing but are fixed for lift in flight.

In sum, the additional forces imposed upon a helicopter by its very concept delayed its development, made it relatively more difficult to control than fixed-wing aircraft, and, in general, impeded its use. While generally considered more expensive to operate than conventional fixed-wing aircraft, a true comparison of costs cannot be made without assessing the additional advantages conferred by the vertical flight capability. The popularity of the helicopter indicates that users willingly pay any additional costs involved to obtain that capability. In some applications—medical evacuation, supplying of oil drilling rigs, spreading of certain agricultural agents, to name but a few—it is irreplaceable.

Thus, in light of the many applications of VTOL aircraft, there is a need to provide means for an improved lift mechanism to overcome the difficulties and inefficiencies discussed hereto.

Furthermore, an apparatus which efficiently provides both vertical lift and the potential for lateral movement by means of a single integrated propulsion system is desired for many applications.

Turbine Engines

Gas turbine engines are any internal-combustion engine employing a gas as the working fluid used to turn a turbine. The term also is conventionally used to describe a complete internal-combustion engine consisting of at least a compressor, a combustion chamber, and a turbine.

Useful work or propulsive thrust can be obtained from a gas-turbine engine. It may drive a generator, pump, or propeller or, in the case of a pure jet aircraft engine, develop thrust by accelerating the turbine exhaust flow through a nozzle. Large amounts of power can be produced by such an engine that, for the same output, is much smaller and lighter than a reciprocating internal-combustion engine. Reciprocating engines depend on the up-and-down motion of a piston, which must then be converted to rotary motion by a crankshaft arrangement, whereas a gas turbine delivers rotary shaft power directly. Although conceptually the gas-turbine engine is a simple device, the components for an efficient unit must be carefully designed and manufactured from costly materials because of the high temperatures and stresses encountered during operation. Thus, gas-turbine engine installations are usually limited to large units where they become cost-effective.

Most gas turbines operate on an open cycle in which air is taken from the atmosphere, compressed in a centrifugal or axial-flow compressor, and then fed into a combustion chamber. Here, fuel is added and burned at an essentially constant pressure with a portion of the air. Additional compressed air, which is bypassed around the burning section and then mixed with the very hot combustion gases, is required to keep the combustion chamber exit (in effect, the turbine inlet) temperature low enough to allow the turbine to operate continuously. If the unit is to produce shaft power, the combustion products (mostly air) are expanded in the turbine to atmospheric pressure. Most of the turbine output is required to operate the compressor; only the remainder is available to supply shaft work to a generator, pump, or other device. In a jet engine the turbine is designed to provide just enough output to drive the compressor and auxiliary devices. The stream of gas then leaves the turbine at an intermediate pressure (above local atmospheric pressure) and is fed through a nozzle to produce thrust.

An idealized gas-turbine engine operating without any losses on this simple Brayton cycle is considered first. If, for example, air enters the compressor at 15 C. and atmospheric pressure and is compressed to one megapascal, it then absorbs heat from the fuel at a constant pressure until the temperature reaches 1,100 C. prior to expansion through the turbine back to atmospheric pressure. This idealized unit would require a turbine output of 1.68 kilowatts for each kilowatt of useful power with 0.68 kilowatt absorbed to drive the compressor. The thermal efficiency of the unit (net work produced divided by energy added through the fuel) would be 48 percent.

If for a unit operating between the same pressure and temperature limits the compressor and the turbine are only 80 percent efficient (i.e., the work of an ideal compressor equals 0.8 times the actual work, while the actual turbine output is 0.8 times the ideal output), the situation changes drastically even if all other components remain ideal. For every kilowatt of net power produced, the turbine must now produce 2.71 kilowatts while the compressor work becomes 1.71 kilowatts. The thermal efficiency drops to 25.9 percent. This illustrates the importance of highly efficient compressors and turbines. Historically it was the difficulty of designing efficient compressors, even more than efficient turbines, that delayed the development of the gas-turbine engine. Modem units can have compressor efficiencies of 86–88 percent and turbine efficiencies of 88–90 percent at design conditions.

Efficiency and power output can be increased by raising the turbine-inlet temperature. All materials lose strength at very high temperatures, however, and since turbine blades travel at high speeds and are subject to severe centrifugal stresses, turbine-inlet temperatures above 1,100 C. require special blade cooling. It can be shown that for every maximum turbine-inlet temperature there is also an optimum pressure ratio. Modern aircraft gas turbines with blade cooling operate at turbine-inlet temperatures above 1,370 C. and at pressure ratios of about 30:1.

In aircraft gas-turbine engines attention must be paid to weight and diameter size. This does not permit the addition of more equipment to improve performance. Accordingly, commercial aircraft engines operate on the simple Brayton cycle idealized above. These limitations do not apply to stationary gas turbines where components may be added to increase efficiency. Improvements could include (1) decreasing compression work by intermediate cooling, (2) increasing turbine output by reheating after partial expansion, or (3) decreasing fuel consumption by regeneration.

The first improvement would involve compressing air at nearly constant temperature. Although this cannot be achieved in practice, it can be approximated by intercooling (i.e., by compressing the air in two or more steps and water-cooling it between steps back to its initial temperature). Cooling decreases the volume of air to be handled and, with it, the compression work required.

The second improvement involves reheating the air after partial expansion through a high-pressure turbine in a second set of combustion chambers before feeding it into a low-pressure turbine for final expansion. This process is similar to the reheating used in a steam turbine.

Both approaches require considerable additional equipment and are used less frequently than the third improvement. Here, the hot exhaust gases from the turbine are passed through a heat exchanger, or regenerator, to increase the temperature of the air leaving the compressor prior to combustion. This reduces the amount of fuel needed to reach the desired turbine-inlet temperature. The increase in efficiency is, however, tied to a large increase in initial cost and will be economical only for units that are run almost continuously.

Early gas turbines employed centrifugal compressors, which are relatively simple and inexpensive. They are, however, limited to low pressure ratios and cannot match the efficiencies of modem axial-flow compressors. Accordingly, centrifugal compressors are used today primarily in small industrial units.

An axial-flow compressor is the reverse of a reaction turbine. The blade passages, which look like twisted, highly curved airfoils, must exert a tangential force on the fluid with the pressures on one side of the blade higher than on the other. For subsonic flow, an increase in pressure requires the flow area to also increase, thus reducing the flow velocity between the blade passages and diffusing the flow. A row of compressor blades must be viewed as a set of closely spaced, highly curved airfoil shapes with which airflow strongly interacts. There will not only be a rise in pressure along the blades but a variation between them as well. Flow friction, leakage, wakes produced by the previous sets of blades, and secondary circulation or swirl flows all contribute to losses in a real unit. Tests of stationary blade assemblies, known as cascades, can be performed in special wind tunnels, but actual blade arrangements in a rotating assembly require special test setups or rigs.

Blades must be designed not only to have the correct aerodynamic shape but also to be light and not prone to critical vibrations. Recent advances in compressor (and turbine) blade design have been aided by extensive computer programs.

While moderately large expansion-pressure ratios can be achieved in a reaction-turbine stage, only relatively small pressure increases can be handled by a compressor stage—typically pressure ratios per stage of 1.35 or 1.4 to 1 in a modem design. Thus, compressors require more stages than turbines. If higher stage pressure ratios are attempted, the flow will tend to separate from the blades, leading to turbulence, reduced pressure rise, and a "stalling" of the compressor with a concurrent loss of engine power. Unfortunately, compressors are most efficient close to this so-called surge condition, where small disturbances can disrupt operation. It remains a major challenge to the designer to maintain high efficiency without stalling the compressor.

As the air is compressed, its volume decreases. Thus the annular passage area should also decrease if the through-flow velocity is to be kept nearly constant—i.e., the blades have to become shorter at higher pressures. An optimum balance of blade-tip speeds and airflow velocities often requires that the rotational speed of the front, low-pressure end of the compressor be less than that of the high-pressure end. This is achieved in large aircraft gas turbines by "spooled" shafts where the shaft for the low-pressure end, driven by the low-pressure portion of the turbine, is running at a different speed within the hollow high-pressure compressor/turbine shaft, with each shaft having its own bearings. Both twin- and triple-spool engines have been developed.

Air leaving the compressor must first be slowed down and then split into two streams. The smaller stream is fed centrally into a region where atomized fuel is injected and burned with a flame held in place by a turbulence-generating obstruction. The larger, cooler stream is then fed into the chamber through holes along a "combustion liner" (a sort of shell) to reduce the overall temperature to a level suitable for the turbine inlet. Combustion can be carried out in a series of nearly cylindrical elements spaced around the circumference of the engine called cans, or in a single annular passage with fuel-injection nozzles at various circumferential positions. The difficulty of achieving nearly uniform exit-temperature distributions in a short aircraft combustion chamber can be alleviated in stationary applications by longer chambers with partial internal reversed flow.

The turbine is normally based on the reaction principle with the hot gases expanding through up to eight stages using one- or two-spooled turbines. In a turbine driving an external load, part of the expansion frequently takes place in a high-pressure turbine that drives only the compressor while the remaining expansion takes place in a separate, "free" turbine connected to the load.

High-performance aircraft engines usually employ multiple spools. A recent large aircraft-engine design operating with an overall pressure ratio of 30.5:1 uses two high-pressure turbine stages to drive 11 high-pressure compressor stages on the outer spool, rotating at 9,860 revolutions per minute, while four low-pressure turbine stages drive the fan for the bypass air as well as four additional low-pressure compressor stages through the inner spool turning at 3,600 revolutions per minute. For stationary units, a total of three to five total turbine stages is more typical.

High temperatures at the turbine inlet and high centrifugal blade stresses necessitate the use of special metallic alloys for the turbine blades. (Such alloys are sometimes grown as single crystals.) Blades subject to very high temperatures also must be cooled by colder air drawn directly from the compressor and fed through internal passages. Two processes are currently used: (1) jet impingement on the inside of hollow blades, and (2) bleeding of air through tiny holes to form a cooling blanket over the outside of the blades.

In a gas-turbine engine driving an electric generator, the speed must be kept constant regardless of the electrical load. A decrease in load from the design maximum can be matched by burning less fuel while keeping the engine speed constant. Fuel flow reduction will lower the exit temperature of the combustion chamber and, with it, the enthalpy drop available to the turbine. Although this reduces the turbine efficiency slightly, it does not affect the compressor, which still handles the same amount of air. The foregoing method of control is substantially different from that of a steam turbine, where the mass flow rate has to be changed to match varying loads.

An aircraft gas-turbine engine is more difficult to control. The required thrust, and with it engine speed, may have to be changed as altitude and aircraft speed are altered. Higher altitudes lead to lower air-inlet temperatures and pressures and reduce the mass flow rate through the engine. Aircraft now use complex computer-driven controls to adjust engine speed and fuel flow while all critical conditions are monitored continuously.

For start-up, gas turbines require an external motor which may be either electric or, for stationary applications, a small diesel engine.

Many other aspects enter into the design of a modern gas-turbine engine, of which only a few examples will be given for the purposes of this survey. Much attention must be paid, especially in a multispool unit, to the design of all bearings, including the thrust bearings that absorb axial forces, and to the lubrication system. As an engine is started up and becomes hot, components elongate or "grow," thereby affecting passage clearances and seals. Other considerations include bleeding air from the compressor and ducting it for turbine-blade cooling or for driving accessories.

By far the most important use of gas turbines is in aviation, where they provide the motive power for jet propulsion. Such details have been provided supra. The present discussion will touch on the use of gas turbines in electric power generation and in certain industrial processes, as a well as consider their role in marine, locomotive, and automotive propulsion.

In the field of electric power generation, gas turbines must compete with steam turbines in large central power stations and with diesel engines in smaller plants. Even though the initial cost of a gas turbine is less than either alternative for moderately sized units, its inherent efficiency is also lower. Yet, a gas-turbine unit requires less space, and it can be placed on-line within minutes, as opposed to a steam unit that requires many hours for start-up. As a consequence, gas-turbine engines have been widely used as medium-sized "peak load" plants to run intermittently during short durations of high power demand on an electric system. In this case, initial costs, rather than fuel charges, become the prime consideration.

Early commercial stationary plants employed aircraft units operating at reduced turbine-inlet temperatures. The high rotational speed of aircraft turbines required special gearing to drive electric generators. More recently, special units have been designed for direct operation (in the United States) at 3,600 revolutions per minute. Units in sizes up to 200,000 kilowatts have been built, although the majority of installations are less than 100,000 kilowatts. These turbines have operated up to 6,000 hours per year on either liquid fuels or natural gas. Typical turbine-inlet temperatures for large units range from about 980 to 1,260 C. with turbine blade cooling used at the higher temperatures.

Efficiency can be improved by adding a regenerator to exploit the high turbine exhaust temperatures (typically about 480 to 590 C.). Alternatively, if the gas turbine serves as a peak-load unit for a continuously running steam power plant, the hot exhaust gases can be used to preheat by means of a heat exchanger the combustion air entering a steam boiler. A modern development involves feeding the gas turbine exhaust directly into a steam generator where additional fuel is burned, producing steam of moderate pressure for a steam turbine. An overall thermal efficiency of nearly 50 percent is claimed for these combined units, making them the most fuel-efficient power plants currently available.

With sizes typically ranging from 1,000 to 50,000 horsepower, industrial gas-turbine engines can be used for many applications. These include driving compressors for pumping natural gas through pipelines, where a small part of the pumped gas serves as the fuel. Such units can be automated so that only occasional on-site supervision is required. A gas turbine can also be incorporated in an oil refining process called the Houdry process, in which pressurized air is passed over a catalyst to burn off accumulated carbon. The hot gases then drive a turbine directly without a combustion chamber. The turbine, in turn, drives a compressor to pressurize the air for the process. Small portable gas turbines with centrifugal compressors also have been used to operate pumps.

In this area of marine application, the gas-turbine engine has two advantages over steam- and diesel-driven plants: it is lightweight and compact. During the early 1970s a ship powered by a gas turbine capable of 20,000 horsepower was successfully tested at sea by the U.S. Navy over a period of more than 5,000 hours. Gas turbines were subsequently selected to power various new U.S. naval vessels.

During the 1950s and '60s, manufacturers of locomotives built a number of vehicles powered by gas-turbine engines that use heavy oil. Although gas-turbine locomotives have had moderate success for long sustained runs, they have not been able to make significant inroads against diesel locomotives under normal running conditions, especially after increases in the relative cost of heavy fuel oils. Moreover, the inherent low efficiency of a simple open-cycle gas turbine becomes even worse at part-load or during idling when considerable fuel is needed to drive the compressor while producing little or no useful power.

Gas-turbine engines were proposed for use in automobiles from the early 1960s. In spite of their small size and weight for a given power output and their low exhaust emissions compared to gasoline engines, the disadvantages of high manufacturing costs, low thermal efficiency, and poor part-load and idling performance have proven gas-turbine cars to be uneconomical and impractical.

The earliest device for extracting rotary mechanical energy from a flowing gas stream was the windmill (see above). It was followed by the smokejack, first sketched by Leonardo da Vinci and subsequently described in detail by John Wilkins, an English clergyman, in 1648. This device consisted of a number of horizontal sails that were mounted on a vertical shaft and driven by the hot air rising from a chimney. With the aid of a simple gearing system, the smokejack was used to turn a roasting spit.

Various impulse and reaction air-turbine drives were developed during the 19th century. These made use of air, compressed externally by a reciprocating compressor, to drive rotary drills, saws, and other devices. Many such units are still being used, but they have little in common with the modem gas-turbine engine, which includes a compressor, combustion chamber, and turbine to make up a self-contained prime mover. The first patent to approximate such a system was issued to John Barber of England in 1791. Barber's design called for separate reciprocating compressors whose output air was directed through a fuel-fired combustion chamber. The hot jet was then played through nozzles onto an impulse wheel. The power produced was to be sufficient to drive both the compressor and an external load. No working model was ever built, but Barber's sketches and the low efficiency of the components available at the time make it clear that the device could not have worked even though it incorporated the essential components of today's gas-turbine engine.

Although many devices were subsequently proposed, the first significant advance was covered in an 1872 patent granted to F. Stolze of Germany. Dubbed the fire turbine, his machine consisted of a multistage, axial-flow air compressor that was mounted on the same shaft as a multistage, reaction turbine. Air from the compressor passed through a heat exchanger, where it was heated by the turbine exhaust gases before passing through a separately fired combustion chamber. The hot compressed air was then ducted to the turbine. Although Stolze's device anticipated almost every feature of a modem gas-turbine engine, both compressor and turbine lacked the necessary efficiencies to sustain operation at the limited turbine-inlet temperature possible at the time.

The first successful gas turbine, built in Paris in 1903, consisted of a three-cylinder, multistage reciprocating compressor, a combustion chamber, and an impulse turbine. It operated in the following way: Air supplied by the compressor was burned in the combustion chamber with liquid fuel. The resulting gases were cooled somewhat by the injection of water and then fed to an impulse turbine. This system, which had a thermal efficiency of about 3 percent, demonstrated for the first time the feasibility of a practical gas-turbine engine.

Two other devices with intermittent gas action, both developed at about the same time, deserve mention. A 10,000-revolutions-per-minute unit built in Paris in 1908 had four explosion chambers located on the periphery of a de Laval impulse turbine. Each chamber, containing air and fuel, was fired sequentially to provide a nearly continuous flow of high-temperature, high-pressure gases that were fed through nozzles to the turbine wheel. The momentary partial vacuum created by the hot gases rushing from the explosion chamber was used to draw in a new charge of air.

Of greater significance was the "explosion" turbine developed by Hans Holzwarth of Germany, whose initial experiments started in 1905. In this system, a compressor introduced a charge of air and fuel into a constant-volume combustion chamber. After ignition, the hot, high-pressure gas escaped through spring-loaded valves into nozzles directed against the blading of a turbine. The valves remained open until the gas was discharged, at which point a fresh charge was brought into the combustion chamber. Since the pressure increase in the compressor was only about one-fourth of the maximum pressure reached after combustion, the unit could operate even though the compressor efficiency was low. Holzwarth and various collaborators continued to develop the explosion turbine for more than 30 years until it was eventually superseded by the modem gas-turbine engine.

To be successful, a steady-flow engine based on the ideas first proposed by Stolze depends not only on high efficiencies (more than 80 percent) for both the rotating compressor and the turbine but also on moderately high turbine-inlet temperatures. The first successful experimental gas turbine using both rotary compressors and turbines was built in 1903 by Aegidus Elling of Norway. In this machine, part of the air leaving a centrifugal compressor was bled off for external power use. The remainder, which was required to drive the turbine, passed through a combustion chamber and then through a steam generator where the hot gas was partially cooled. This combustion gas was cooled further (by steam injected into it) to 400 C., the maximum temperature that Elling's radial-inflow turbine could handle. The earliest operational turbine of this type delivered 11 horsepower. Many subsequent improvements led to another experimental Elling turbine, which by 1932 could produce 75 horsepower. It employed a compressor with 71-percent efficiency and a turbine with an efficiency of 82 percent operating at an inlet temperature of 550 C. Norway's industry, however, was unable to capitalize on these developments, and no commercial units were built. The first industrial success did not come until 1936, when the Swiss firm of Brown Boveri independently developed a gas turbine for the Houdry process (see supra).

Also during the mid-1930s a group headed by Frank Whittle at the British Royal Aircraft Establishment (RAE) undertook efforts to design an efficient gas turbine for jet propulsion of aircraft. The unit produced by Whittle's group worked successfully during tests; it was determined that a pressure ratio of about 4 could be realized with a single centrifugal compressor running at roughly 17,000 revolutions per minute. Shortly after Whittle's achievement, another RAE group, led by A. A. Griffith and H. Constant, began developmental work on an axial-flow compressor. Axial-flow compressors, though much more complex and costly, were better suited for detailed blade-design analysis and could reach higher pressures and flow rates and, eventually, higher efficiencies than their centrifugal counterparts.

Independent parallel developments in Germany, initiated by Hans P. von Ohain working with the manufacturing firm of Ernst Heinkel, resulted in a fully operational jet aircraft engine that featured a single centrifugal compressor and a radial-inflow turbine. This engine was successfully tested in the world's first jet-powered airplane flight on Aug. 27, 1939. Subsequent German developments directed by Anselm Franz led to the Junkers Jumo 004 engine for the Messerschmitt Me-262 aircraft, which was first flown in 1942. In Germany as well as in Britain, the search for higher temperature materials and longer engine life was aided by experience gained in developing aircraft turbosuperchargers.

Before the end of World War II gas-turbine jet engines built by Britain, Germany, and the United States were flown in combat aircraft. Within the next few decades both propeller-driven gas-turbine engines (turboprops) and pure jet engines developed rapidly, with the latter assuming an ever larger role as airplane speeds increased.

Because of the significant advances in gas-turbine engine design in the years following World War II, it was expected that such systems would become an important prime mover in many areas of application. However, the high cost of efficient compressors and turbines, coupled with the continued need for moderate turbine-inlet temperatures, have limited the adoption of gas-turbine engines. Their preeminence remains assured only in the field of aircraft propulsion for medium and large planes that operate at either subsonic or supersonic speeds. As for electric power generation, large central power plants that use steam or hydraulic turbines are expected to continue to predominate. The prospects appear bright, nonetheless, for medium-sized plants employing gas-turbine engines in combination with steam turbines. Further use of gas-turbine engines for peak power production is likely as well. These turbine engines also remain attractive for small and medium-sized, high-speed marine vessels and for certain industrial applications.

While efficient and widely used, the turbine engine is not put to its fullest use or at its greatest efficiency due to the spin imparted to the exhaust. Eliminating toroidal vortices from the exhaust would result in higher efficiency and its possible use in a vertical lifting apparatus.

Vortex Attractors

The present invention could also find use in a vortex attractor, for example, as described by applicant's own application Ser. No. 09/316,318, filed May 21, 1999, which is herein incorporated by reference. Such a vortex attractor is an efficient apparatus capable of generating a negative pressure region that produces attractive forces in the form of a vortex flow. The vortex attractor may be used alone or in conjunction with other mechanical or electronic systems. The vortex attractor has the functional ability to pull, suck, suspend, hold, lift and interrupt. The negative pressure regions also can adhere a vortex attractor to a surface. For example, such an apparatus is capable of pulling itself toward a surface or maintaining itself a certain distance relative to a surface. Furthermore, the fluids that may be acted upon include any gas (e.g., air), liquid (e.g., water), any combination thereof, slurries, or any gas and/or liquid having solids and/or particulates dispersed therethrough.

These general uses and additional examples described herein are accomplished by the vortex attractor comprising one or more impellers or vanes, and a shell. The impeller or impellers are positioned within a shell that has one open end, or impeller end. Materials of construction for a vortex attractor will vary depending on the desired application.

The shell comprises a containing ring or wall and a backplate for said wall. The containing ring or wall may be attached to the impeller vanes and rotate with them or may be separate from the vanes (relatively close to the vane ends) and may be mounted on a stationary frame. The backplate may be connected with the impeller vanes and rotate with them or may be separate from the vanes (relatively close to the vanes), and may be mounted to a stationary frame. The containing ring and/or backplate may be sealed such that fluid cannot flow radially through the vanes or backwards behind them, or they may have apertures or vents in them to allow for some fluid to circulate radially and behind. These apertures or vents preferably are configured such that sufficient surface area remains upon the containing ring and/or backplate to act upon the fluid and induce a vortex flow. Furthermore, the apertures or vents may be controllable in order to rapidly reduce attraction. The fluid flow through the vents may be used to power auxiliary functions or for measurement control.

The impellers rotate about an axis within the containing ring. The axis typically corresponds with a driveshaft which passes through the backplate. Generally, the impellers rotate about a central axis of the containing ring or wall. However, this axis may be positioned other than centrally depending on the impeller configuration, the shape of the containing wall and the particular application. The impellers or vanes may be incorporated in the containing walls, or may be separately rotatable. The vanes may be flat, curved or pitched and various configurations are possible.

The device may optionally include a safety screen or ring, or may have a shield mounted on the vanes in a manner that does not obstruct fluid flow in directions necessary for correct operation of the vortex attractor. Such shields are for safety purposes or to prevent the possibility of obstructions within the vanes.

The shape of the shell may vary depending on aesthetics, functionality or efficiency requirements. One particularly useful effect of differing shapes of the shell is the variations in the shape if the fluid flow. The containing wall may have a plan view resembling a circle, ellipse, polygon or polygon having rounded vertices or corners. The containing walls may be perpendicular to the backplate or may be at an acute or obtuse angle relative to the backplate. Furthermore, the containing walls may be straight, arcuate, U-shaped, V-shaped (with the open portions of the "U" or "V" facing away from or toward the impeller) or S-shaped (which may also be in the form of a backwards "S"), for example.

When the backplate is not connected to the impeller blades an aperture is provided for the driveshaft to rotatably pass through said backplate. If a completely sealed backplate is required, the driveshaft may pass through sealed and lubricated gasket or bearing assembly. The backplate, whether connected to the impeller blades, or separate from them, may also contain one or more additional apertures or slits. These additional apertures or slits may be provided to minimize weight, for decorative purposes or to provide any desired functionality related to specific configuration or application. These additional apertures or slits may be provided in order to generate external fluid flow for auxiliary functions or monitoring.

Moreover, it is not necessary that the backplate be planar. The backplate may be convex or concave, or it may have a shaped of a cone, pyramid, truncated pyramid or other polyhedral. Additionally, alternate designs may incorporate a backplate which is asymmetrical or irregular with respect to the vanes. Any three-dimensional shape that does not interfere with the impeller action may serve as the backplate.

The driveshaft of the vortex attractor may be powered by any conceivable means, such as AC or DC electric motors, gas or fuel combustion motors, steam power, compressed gas or air, flywheel or a mechanical winder device. The driveshaft may be of any length or shape, and it may be flexible, allowing for optimum positioning and maneuverability of the vortex attractor. Power may be provided directly from the motor to the driveshaft, or by one or more drive belts or chains connecting the driveshaft to the motor. Optional gears may be provided which allow the driveshaft to reverse the direction of rotation or allow for the speed of the impeller to be controlled at a constant motor speed. Alternative drive mechanisms may also be used, such as water, wind or magnetic arrangements. Furthermore, the power source may also provide energy to additional devices fixed to the vortex attractor.

Preferably, the containing ring height should be similar to that of the impeller. A stationary containing ring may be made to extend above the height of the impeller so that when the vortex attractor pulls an object or pulls itself toward a surface, the edge of the containing ring contacts the object or surface rather than the blades of the impeller. Alternatively, the containing ring wall height may vary around the impellers, for example, to provide a means to direct the vortex flow. Other arrangements may include a flexible or adjustable containing wall, so that when the impeller end contacts a non-planar surface, ambient fluid can be prevented from entering the system.

The forces of the vortex attractor are generated by the spinning impeller or impellers which act upon fluid entering from the open end of the vortex attractor. Fluid is drawn in through the region about the axis of the impellers, and it is forced through the impellers to the walls of the containing ring. The fluid flows tangentially from the containing ring in an upward direction. Generally, the path of the fluid flow resembles a spiral, with a loop that travels through the center of the spiral to the region about the axis of the impeller. The direction of the spin does not matter, as the only change would be the direction of the fluid flow and the same attractive forces are generated. The fluid flow creates a low pressure region near the axis of the impeller. Fluid is forced back toward the impellers due to the loss in velocity caused by resistance encountered from ambient fluid outside the path of fluid flow. This spiral path having a return loop through the spiral is continuous while the impellers spin. If the impeller velocity is decreased or increased, the distance of the fluid flow from the containing ring and the speed of the fluid flow will accordingly vary.

A desirable feature of vortex attractor is that the flow through the system is limited, as there is not a separate fluid intake and exhaust. The fluid circulating through the vanes of the impeller originates from the region about the impeller axis and within the confines of an imaginary frustum or cylinder extending away from the impeller end of the shell rather than from a separate inlet. This eliminates the inefficiencies created by methods of the prior art because the system need not continuously cause a fluid flow from an intake through an exhaust.

A protective screen, plate or specific shell geometry may be applicable to position a shield in front of the impeller blades to minimize injury and to prevent objects from striking the impeller. The screen may comprise concentric circles or a spiral screen. Other arrangements include covering the region above the impeller blade path with a separate ring plate or with certain shell geometry. For example, the containing wall may be fabricated having a portion that extends toward the impeller axis to protect the vanes. Preferably, such a plate or extended portion allows fluid to flow through the region about the axis of the impeller, and allows fluid to exit through the region near the containing ring walls.

The vortex attractor generates a low pressure area that extends from the impeller end to the object or objects to be attracted (or object being attracted to). The low pressure region between the impellers and the object is maintained by the impeller motion. The vortex attraction forces increase as the object moves closer to the containing ring, as there is less resistance from ambient fluid.

One particularly useful feature of the vortex apparatus is that the distance from the impeller blades to the surface has an approximate linear relationship with the impeller operating power requirement and the attractive forces generated. The vortex power increases linearly as distance increases, and the vortex lift decreases linearly as distance increases. This linearity (over part of the range of distances from the impeller blade) provides predictability and efficiency in applications where the vortex attractor is maintained a certain distance from a stationary or non-stationary surface. Objects may be suspended a distance from the vortex attractor (rather than be removably adhered), or alternatively, the vortex attractor may be suspended a distance from a stationary surface. For optimal suspension, a responsive control system could be utilized that senses any change which may effect the required impeller speed and accordingly adjust the speed. Moreover, the linearity proves useful for control mechanisms, motion sensors, measurement devices or speed detectors. Outside fluid effects, such as wind, turbulence or deterioration of the fluid flow from movement of the vortex device, should be taken into consideration when fluid is between the impeller and the surface (note that this is not a major factor when the object is removably adhered to the vortex attractor, as little or no additional fluid flows from the ambient surrounding acts upon the system).

Furthermore, the pressure differential (and hence the attractive forces) may be varied for certain applications (i.e., maintain separate distances between the impeller end and the surface) by changing the speed of the impellers. The impeller speed can be changed by varying the power input or with a gear transmission system. Additionally, a gear transmission may also relate power from the impeller power source to auxiliary devices.

The principles of the vortex flow and reduced pressure are applicable in multiple applications, on scales ranging from microscopic to very large. The vortex attractor may be used alone, in combination with wheel or tracks, on a conveyor belt, etc. Various devices may be attached to the vortex attractor for sensing, measuring, recording, etc. A warning system may be provided for vortex attractors operating on a limited power source, such as a battery, to prevent the attractor from failing while in use. Furthermore, the vortex attractor may be controlled manually, remotely by computer, conventional remote control or via on-board software. Additionally, the vortex attractor may be made to include the ability to deflect its vanes in such a way to generate lateral movement. The controlled elements of the vortex attractor may include impeller speed, by variations in power input and/or by gear changes, impeller blade distance from the impeller end of the containing ring or outer shield or power source variations.

A substantially modified vortex attractor comprises an impeller or vanes and a shell having an inner shield and an outer shield. The vanes may be mounted to a backplate, or an impeller assembly may be separately rotatable relative to the inner shield. The impeller is positioned within one end of the outer shield (the impeller end), and the inner shield is concentric to the outer shield, and generally prevents fluid flow within the center of the portion of the outer shield behind the impeller assembly. Fluid is directed through the center of the impellers and spirals out through the region between the inner shield and the outer shield. Attractive forces are generated toward the impeller end of the outer shield due to the vortex flow extending therefrom.

Survey of the Prior Disclosures

Havercamp U.S. Pat. No. 3,233,693 (the '693 patent) is directed to an improved ground effect machine, e.g., a hovercraft, operable over a wide range of terrain. The '693 patent teaches an improved ground effect machine through the use of an airframe that at least in part includes a flexible canopy that inflates upon initiation of device operation. While the '693 patent teaches a device using an air pressure gradient to generate a force, it is entirely different from what is taught herein. The '693 patent is directed largely to an overall hovercraft airframe structure, and is much less concerned with the means of generating the sustentation force. Furthermore, nowhere does Havercamp teach or mention the generation of a vortex, nor its use as a means to generate a force.

Cockerell U.S. Pat. No. 3,363,716, described supra, is pointed to vehicles for traveling over land and/or water. A vehicle is provided having means to discharge a jet of fluid in the form of a curtain which effectively encloses a space beneath the underside of vehicle and a surface over which the vehicle is to hover or travel. The jet of fluid is expelled with a total thrust less than the total weight of the vehicle. The arrangement is such that when the device is in operation, pressures are built up underneath the device which are sufficient to support the vehicle. Cockerell teaches a method of providing a curtain of fluid that can provide sufficient force to keep the vehicle suspended. However, Cockerell does not incorporate any type of means to control the generation of vortices that could drastically improve efficiency.

Rogers U.S. Pat. No. 3,394,906 (the '906 patent) is directed to an aircraft comprising a circular shaped body portion and a central duct extending therethrough. A motor driven propeller is provided within the central duct to power the craft, and several airfoils are provided to furnish lift and stability. The object of this aircraft is to provide a model of a flying saucer that will illustrate the flight characteristics of a disc-shaped craft. Like all aircraft, the device taught by the '906 patent employs a pressure gradient to achieve and sustain flight. However, the aggregate of this disclosure describes the airframe design of a flying saucer. The '906 patent does not teach any novel propulsive means. The propulsive means described are conventional in nature, and importantly, do not generate a vortex.

Parkhouse U.S. Pat. No. 3,561,558 (the '558 patent) discloses a ground effect craft, e.g., a hovercraft, comprising a body structure, a fan for forming a cushion of pressurized gas beneath the body structure, apertures for discharging fluid laterally from either side of the craft to effect turning moments and an additional fan for propelling the craft forward. Aerodynamic control surfaces are used for steering the craft. While the '558 patent teaches a device using an air pressure gradient to generate a force, it is directed to a very different field than the invention disclosed herein. The '558 patent describes a hovercraft configuration consisting of a number of propulsive means, and is much less concerned with the specific design of these means than their integration into a craft. Importantly, nowhere does Parkhouse teach or mention the generation of a vortex, nor its use as a means to generate a force.

Ingro U.S. Pat. No. 3,810,515 (the '515 patent) is pointed to a device that is adapted to climb vertical walls and travel across ceilings without the use of tracks or other external mounting devices. Either magnetic or suction means are used to attach itself to vertical surfaces. The device comprises a rotor to constantly eject fluid thereby maintaining suction. The '515 patent is directed largely to a climbing device structure, and does not teach in detail the suction generating means used therein. Importantly, nowhere does the '515 patent teach or mention the generation of a vortex, nor its use as a means to generate a force.

Shino et al U.S. Pat. No. 3,926,277 (the '277 patent) discloses a vehicle that can travel freely over any horizontal, vertical or inclined surface. The vehicle comprises a hollow body and means to generate a vacuum therein. The device employs a conventional fan to generate a continuous airflow and the resultant low pressure region. The low pressure region accounts for the attractive force between the vehicle and the surface. The '277 patent is directed largely to a vehicle structure, and does not teach any novel type of suction generating means used therein. Importantly, nowhere does the '277 patent teach or mention the generation of a vortex, nor its use as a means to generate a force.

Shino et al U.S. Pat. No. 3,955,642 (the '642 patent) is directed to a vehicle that can travel freely over any horizontal, vertical or inclined surface. The vehicle comprises a hollow body and means to generate a vacuum therein. The device employs a conventional fan to generate a continuous airflow and the resultant low pressure region. The low pressure region accounts for the attractive force between the vehicle and the surface. While the '642 patent describes a device using a low air pressure region creating an attractive force, it is entirely different from what is taught herein. The '642 patent is directed largely to a vehicle structure, and does not teach any novel type of attractive force generating means used therein. Importantly, nowhere does the '642 patent teach or mention the generation of a vortex, nor its use as a means to generate a force.

Goldfarb et al U.S. Pat. No. 4,249,334 (the '334 patent) describes a toy hovercraft and launcher having a frame, an outwardly projecting skirt, and a motor that rotates a fan. The fan draws air in through inlets on the top of the craft to create a pressurized air cushion in the skirt portion. The pressurized region allows the craft to float over a substantially flat surface. While the '334 patent teaches a device using an air pressure gradient to generate a force, it is entirely different from what is taught herein. The '334 patent is directed largely to a toy hovercraft airframe structure and launcher, and is much less concerned with the means of generating the sustentation force. Importantly, nowhere does Goldfarb et al teach or mention the generation of a vortex, nor its use as a means to generate a force.

Weiss et al U.S. Pat. No. 4,316,721 (the '721 patent) relates to a method for producing a thrust in maneuvering engines for watercraft and a maneuvering engine constructed for the same. The method comprises the annular driving water jet supplied to the diffuser and enveloping a first suction water jet fed to a second suction water jet supplied to the diffuser inner wall surface. The maneuvering engine is constructed in such a way that the rear part of the engine casing is provided with an inlet port having a smaller diameter than the outlet port and located in the vicinity of the outlet port of the front engine part, whereby for the optimum adaptation of the exit mixing jet velocity to the vehicle speed a water jet exit cross-section regulating device is provided. Whereas the '721 patent is directed toward improved means of generating thrust in a watercraft, the present invention is directed towards a more efficient lifting device, utilizing the effects of a partial toroidal vortex.

Logan U.S. Pat. No. 4,416,346 (the '346 patent) teaches a steering, propelling and skirting means for air cushion vehicles. The steering, propelling or skirting means is biased to maintain contact with the underlying support surface, thereby improving control of the vehicle, as well as reducing fluid loss with respect to the skirting. The aggregate of the '346 patent is directed to an extensible device, e.g., a wheel, for maintaining contact with the surface which the vehicle is traversing. Unlike the present invention, no mention is made of a novel propulsive means utilizing the effects of a partial toroidal vortex.

Willis U.S. Pat. No. 4,519,562 (the '562 patent) describes a vertical take-off and landing aircraft utilizing a lifting phenomenon that creates a vertical lifting force on a lifting element that curves outwardly from horizontal to vertical. A primary fluid flows through a nozzle slit opening across the lifting element from one side to its opposite, divergently bounding the flowing primary fluid adjacent the entire length of the top of lifting element having at least 40% porosity. All the while the primary fluid is flowing, a sufficient amount of augmenting fluid is also passed through the porous surface to maintain the combined flowing fluid stream in laminar flow adjacent to the top of the element. Through these steps, a differential pressure is created on the element causing it to lift vertically. Also described is a method of energy recovery that involves a certain arrangement of turbines to utilize wasted heat energy. The '562 patent, however, does not disclose or suggest any type of vortex flow, nor does it suggest a similar means of energy recovery as described herein.

Taylor U.S. Pat. No. 4,579,187 (the '187 patent) discloses a high mobility stores vehicle of the air cushion type that can travel quickly across rough terrain. After reaching its destination, the vehicle can firmly anchor itself to the ground using spikes or by reversing the rotation of the air cushion means. The air cushion means comprises a number of fans mounted in suitable housings which create a down draft in floating mode, and reverse rotation to create suction in anchor mode. While the '187 patent teaches the use of pressure gradients to generate attractive and repulsive forces, the specific means and results differ greatly from those described herein. The '187 patent is directed largely to a vehicle structure having means to float the craft or attach it to the ground. Importantly, Taylor does not disclose the generation or use of any type of vortex flow.

Buchelt U.S. Pat. No. 4,796,836 (the '836 patent) discloses a hovering or VTOL aircraft with a propulsion unit utilizing a fan in a shroud whose upper end is toroidally shaped and rotationally symmetrical with a convex curvature. The blade, having a certain minimum twist such that the airflow velocity through the meridian increases outwardly from the hub of the fan toward the periphery of the fan. The '836 patent is directed largely to a lifting structure meant to address the inaccuracies in analysis upon which prior designs are based. The present invention, however, does not in any fashion rely on the prior designs, and instead, produces lift force via a novel generation of a partial toroidal vortex.

Suto U.S. Pat. No. 4,964,835 (the '835 patent) is directed to an air cushion vehicle toy. The toy is comprised of a body having an air inlet and levitation air vent holes. A skirt is attached to the lower area of the body that is inflated by a centrifugal blower. This, in turn, causes the body of the craft to levitate. Additional blowers are provided on the upper body to propel the toy forward or backward. A remote control unit is used to independently activate the blowers, and hence, control the toy. While the '835 patent teaches a device using an air pressure gradient to generate a force, it is directed to a very different field than the present invention. The '835 patent describes a toy hovercraft configuration consisting of a number of propulsive means, and is much less concerned with the specific design of these means than their integration into a craft. Importantly, nowhere does Suto teach or mention the generation of a vortex, nor its use as a means to generate a force.

Chan U.S. Pat. No. 5,564,963 (the '963 patent) describes a toy supported by a self-generated air cushion. The major components of the toy are the base, a pillow having a top and bottom perforated sheet, and means for drawing air into the pillow and expelling it through the bottom perforations. The air expelling through the bottom sheet creates an air cushion on which the toy levitates. While the '963 patent teaches a device using an air pressure gradient to generate a force, it is entirely different from what is taught herein. The '963 patent is directed largely to a toy hovercraft structure, and is much less concerned with the specific means of generating the lift force. Importantly, nowhere does Chan teach or mention the generation of a vortex, nor its use as a means to generate a force.

Walter et al U.S. Pat. No. 6,082,478 discloses a lift augmented ground effect platform of characterized by two pairs of annular concentric air curtain nozzles and supercharge nozzles which direct respective jet streams downward and inward beneath the downwardly facing lifting surface of the platform. The concentric arrangement of the nozzles provides an inner or central supercharged air cushion surrounded by an inner central air curtain and an outer or peripheral air cushion surrounded by a peripheral air curtain. Such an arrangement is claimed to provide an increased or "large" augmentation of the forces acting to raise or lift the platform over that experienced in prior ground effect devices by directing an air flow stream over the downwardly curved peripheral surface of the platform. As the air flows downwardly along the curvature of the platform's peripheral surface, it creates a negative pressure differential which provides an additional lifting force contributing to support of the platform. The airflow stream and the jet stream are provided by, for example, propeller(s) or rotating fan device(s) mounted exterior or interior of the platform. The exterior mounting or specialized interior mounting provides two benefits: first, the propeller or fan stall due to the jet stream source is eliminated and second, smooth transition into free air (out of ground effect) is permitted where necessary to navigate rivers, canyons, and other types of physical barriers which may disrupt ground effect operation. An unpowered variation of the platform may be adapted for releasable attachment to a separate powered vehicle to serve as a performance enhancing lift augmentation platform. While Walter et al discloses an improved lifting platform, there is no mention of the generation of a vortex flow. The only mention, in fact, of the term "vortex" is the occurrence wherein small vortices form around the tips of a rotating propeller. Such vortex generation is not novel. The present invention discloses means that contribute to an improved lifting platform that utilizes a partial toroidal vortex, generated outside the confines of the device, which functions to assist in generating a pressure buildup underneath the device in a lifting platform configuration.

There are many more hovercraft patents displaying all sorts of air ducting. Many of them claim lift generation by adding wings internal to the airflow. These appear to claim lift by the Bernoulli principle, but examination using momentum theory shows that in fact these devices do not generate any lift even though the local airflow may suggest that they do. These patents appear to simply cover particular arrangements of parts, rather than to protect fundamental systems. If these systems do hover at approximately one radius above the ground, as some do claim, this is achieved by brute force.

Thus, the prior art suggests a strong need for a versatile, efficient lifting platform utilizing various means such as propeller, impeller or gas turbine drive that creates and maintains a raised pressure area beneath the platform. As an added benefit, the lifting platform may also be configured as an attractor device.

SUMMARY OF THE INVENTION

Lifting platforms are generally associated with hovercraft in which a high pressure area beneath the vehicle maintained either by a skirt or by dynamic air flow, lifts the vehicle a small distance above the operating surface. The new systems described here employ two methods of lift generation in order to raise the vehicle higher up than a conventional hovercraft. This dual lift concept is extended to flight at altitude and in an extreme case allows the vehicle to fly upward and then change its operation to that of a vortex attractor. It is considered that the device is capable of lateral movement in both lift mode and vortex attractor mode. Additionally, it is considered that through the steps described to eliminate parasitic cylindrical vortices the performance and applicability of various types of turbine engines could be enhanced. What follows is a brief survey of the present invention's applicability to several of the many possible fields discussed herein.

In the field of hovercrafts, the present invention finds use in embodiments that increase the pressure generated by the lifting apparatus, while increasing operating efficiency. For example, a hollow skirt is proposed such that at the point where the gas exits the skirt, a toroidal vortex is formed that generates a fluidic seal. Alternatively, ducted fans with expanded hubs are proposed that increase the area of the high pressure zone when operated in close proximity to the operating surface. The new hovering platform generates a downward airflow in its outer part. Such airflow generation produces direct lift in the same way that a helicopter's rotor generates lift. The amount of lift depends on the area allocated to it just as a helicopter's lift depends to a large extent on the rotor diameter. The downward flowing air from the direct lift system is also used to form a high pressure area under the central body that may be understood as the formation of a partial toroidal vortex around the center. This lift producing high pressure area is provided without consuming any power and is a byproduct of the downward airflow generation. The combined lift is consequently much greater than that for a helicopter with comparable rotor swept area and power. Increasing the central area while keeping the direct lift area the same increases the lift without increasing the power.

The dual lift system; direct lift from a rotor, propeller or jet, and static pressure beneath the central area, is greatest when in close proximity to the ground and decreases with height above the ground. When at altitude, the static lifting pressure falls to the atmospheric level and so produces no lift. A rough guide is that the static pressure effect is useful for altitudes of up to one platform diameter.

The difference between the new platform and a hovercraft lies in the expansion of the peripheral jet to form a direct dynamic lift producing zone in its own right. The static pressure zone beneath the platform is a power free byproduct of the dynamic lift generation. Furthermore, the horizontal movement of a hovercraft is disclosed wherein a single propulsion system provides both lift and forward, reverse, and/or other lateral movements, compared to conventional hovercraft designs which require secondary propulsion for forward or reverse lateral movements.

Furthermore, various VTOL craft could benefit from the lifting apparatus of the present invention. Many VTOL craft utilize complex apparatus to effect vertical lift. Such apparatus can comprise a mechanism to tilt the main drive, i.e., the propellers or turbines, or alternatively, additional lifting apparatus, e.g., turbines, could be employed to effect the vertical lift, distinct from the main drive. Since the lifting apparatus proposed herein is much more efficient than those conceived previously, it is considered that the present invention could make the use of additional apparatus to effect vertical lift more feasible. Thus, such a system would comprise an optimized main drive that need not complicate design or compromise structural integrity (due to the tilting apparatus) as well as an optimized vertical lift apparatus.

Additionally, it is considered that application exists in the field of turbine engines. The very nature of turbine engines causes a spin to be imparted to the exhaust gas. The rotating flow below the propellor reduces positive pressure build up and in extreme cases, may even negate it. Thus, the analysis of vortex flow and the forces thereof lead to applications wherein advances in efficiency can be made through both their utilization and elimination. Furthermore, specific modifications of conventional turbine engines are contemplated for improved use in lifting applications. It is widely known that aircraft jet engines are designed to operate most efficiently when moving horizontally at flying speed. In some instances, they are designed to sacrifice some flying speed in order to generate high thrust while stationary on the ground. However, difficulties arise when a jet engine operates vertically close to the ground wherein gas is blown downwards for vertical takeoff. Thus, a means is described that increases the available thrust of a jet engine when it is close to the ground by producing a thrust characteristic inversely proportional to altitude.

Thus, this invention relates to a propeller, impeller or gas turbine drive for a lifting platform. Therein, the effects of toroidal vortices, both beneficial and parasitic, are examined in relation to the present invention. The axial air rotation from the drive source is eliminated in order to permit the development of a partial toroidal vortex which effectively maintains a raised air pressure zone beneath the platform. Alternatively, to assist in generating lift, parasitic cylindrical vortices are eliminated through the use of vanes or like means to increase efficiency. Additionally, to provide horizontal forces while yielding only negligible reduction in lifting force, vanes may be implemented such that they are deflected away from the vertical axis to establish these desired horizontal forces. Such horizontal forces may be approximately equal to the horizontal component of the rate of change of air momentum resulting from the reduced lifting force caused by deflecting the vanes. Furthermore, as mentioned, dual use is possible as a vortex attractor, where, in contradistinction, the cylindrical vortices are desirable. Last, an embodiment is disclosed that utilizes a complete toroidal vortex that retains an even greater deal of expended energy, and thus, is even more efficient that the partial toroidal vortex lifting platforms.

Thus, it is an object of the present invention to provide an improved lifting platform.

Further, it is an object of the present invention to provide an improved lifting platform that utilizes a variety of drives.

Further, it is an object of the present invention to provide an improved lifting platform that utilizes a propeller drive.

Further, it is an object of the present invention to provide an improved lifting platform that utilizes an impeller drive.

Further, it is an object of the present invention to provide an improved lifting platform that utilizes a gas turbine drive.

Further, it is an object of the present invention to provide an improved lifting platform that utilizes a centrifugal blower drive.

It is another object of the invention to provide a basis for the vortex analysis of exhaust fluid flow that has a negative effect on the lift properties of conventional ground effect drives due to cylindrical vortices.

It is another object of the invention to provide a basis for the vortex analysis of exhaust fluid flow that has a positive effect on the lift properties of conventional ground effect drives due to toroidal vortices.

It is a further object of the present invention to utilize flow straightening vanes along with ducted fans used close to a surface to maximize lift.

It is another object of the present invention to provide a lifting platform that may be configured as an attractor device.

Furthermore, it is an object of the present invention to provide an expanded hub ducted fan to introduce higher pressure underneath the lifting platform.

Further, it is an object of the present invention to provide an expanded hub ducted fan to increase efficiency in a ground effect vehicle while hovering close to the surface.

It is yet another object of the invention to provide an improved hollow skirt for a hovercraft.

Additionally, it is an object of the present invention to utilize centrifugal blowers as drive means for a ground effect lifting platform.

It is a further object of the invention to provide a ground effect platform that utilize input and/or output wings to generate lift from the airflow.

It is a further object of the invention to provide an apparatus which moves laterally. It is a further object of the invention to provide a hovering device which moves laterally.

It is a further object of the invention to provide a single propulsion system which provides both lift and lateral movement.

It is an additional object of the present invention to provide a lifting platform that utilizes an energy recovering complete toroidal vortex drive.

SUMMARY OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 20 (PRIOR ART) depicts a stationary jet engine developing horizontal thrust;

FIG. 21A (PRIOR ART) depicts a stationary jet engine operating vertically above, yet close to a horizontal surface;

FIG. 21B (PRIOR ART) depicts the resultant pressure profile from a stationary jet engine operating vertically above, yet close to a horizontal surface;

FIG. 22A depicts the addition of a double shroud system to a vertically operating jet engine;

FIG. 22B shows a side view of the double shroud system;

FIG. 22C shows the resultant pressure distribution from the double shroud system.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Certain terminology will be used in the following description for convenience in reference only and will not be limiting. The words "in" and "out" will refer to directions toward and away from, respectively, the geometric center of the device and designated and/or reference parts thereof The words "up" and "down" will indicate directions relative to the horizontal and as depicted in the various figures. The words "clockwise" and "counterclockwise" will indicate rotation relative to a standard "right-handed" coordinate system. Such terminology will include the words above specifically mentioned, derivatives thereof and words of similar import.

Figure 1A:
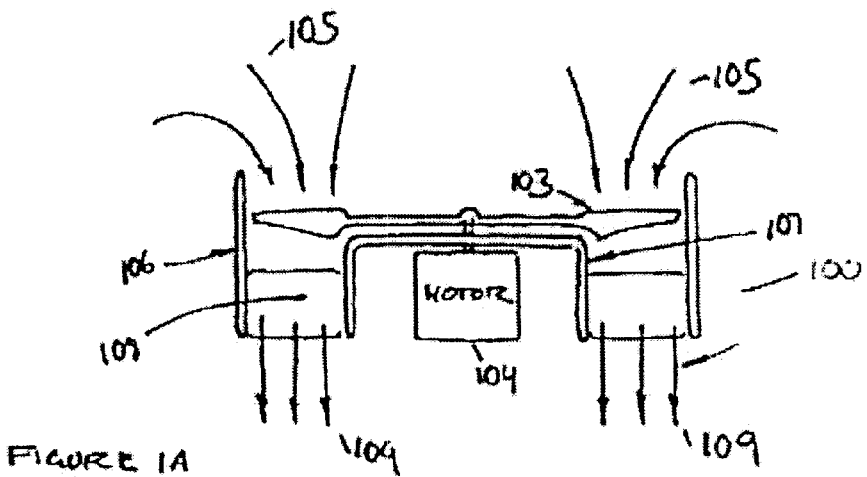
FIG. 1A depicts a lifting platform utilizing a fan or propeller.
Figure 1B:
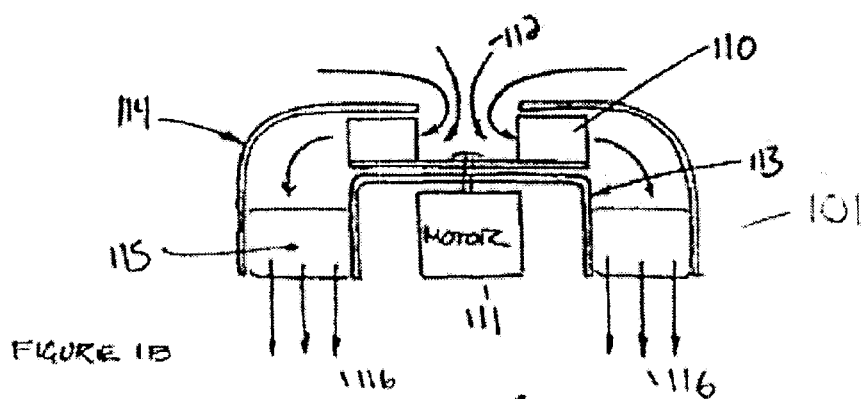
FIG. 1B illustrates a lifting platform utilizing a centrifugal pump.
Figure 1C:
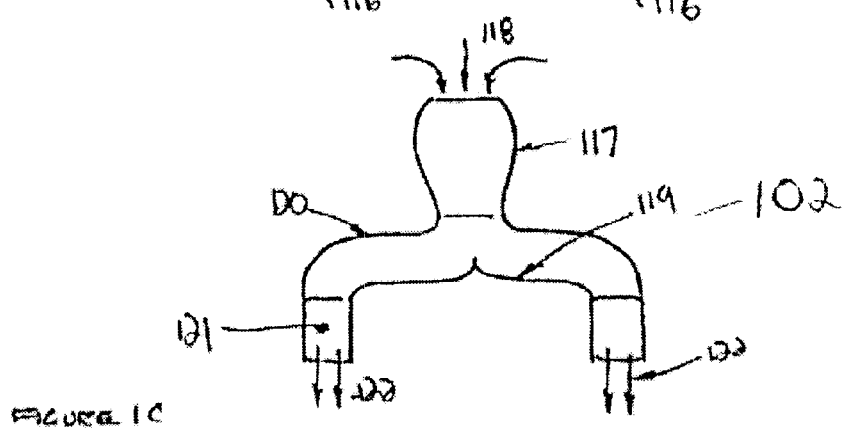
FIG. 1C illustrates a lifting platform utilizing a jet engine.
Figure 2:
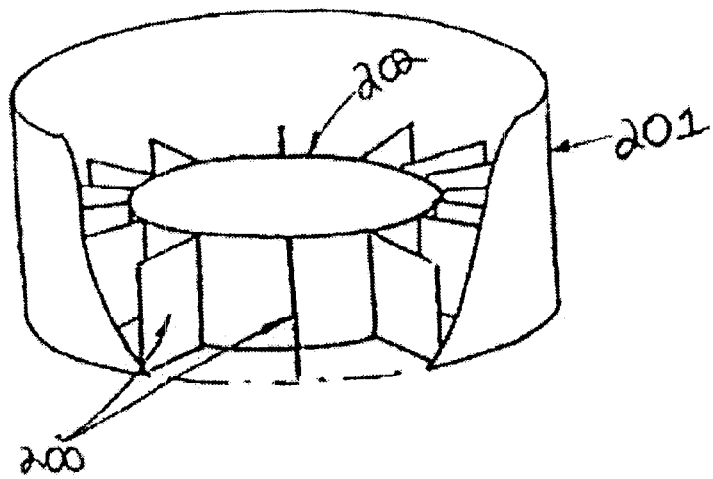
FIG. 2 depicts the flow straightening vanes in detail.

As mentioned previously, the present invention utilizes two lift systems. The first lift system pushes air from a propeller, fan or pump downwards and may also use downward directed gasses from a gas turbine or jet engine exhaust. Three basic configurations are shown in FIGS. 1A, 1B and 1C. The first system 100, depicted in FIG. 1A, has a propeller or fan 103. Propeller or fan 103 is rotated by a motor 104. This causes air 105 to flow into the device 100, between outer shroud 106 and inner shroud 107, through flow straightening vanes 108, to finally be ejected downward as denoted by arrows 109, at a speed V and density ρ. The second system, 101, depicted in FIG. 1B, utilizes a centrifugal pump comprising impeller 110 which is rotated by motor 111. The input airflow flows through the vanes of the impeller 110 and flows between inner shroud 113 and outer shroud 114 and finally through flow straightening vanes 115. The air 112 is then ejected downwards in accordance with arrows 116, with specific V and ρ. The third system, 102, depicted in FIG. 1C, utilizes a gas turbine engine 117. Jet engine 117 sucks air in 118 and ejects it at a much higher rate through the channel between inner shroud 119 and outer shroud 120. The air then flows downward through flow straightening vanes 121 and is ejected downward in accordance with arrows 122. In each case air is directed downwards between an inner and an outer shroud . For the system to operate with optimum efficiency the air movement must have no "swirling" component and so at the bottom section a set of radially mounted "flow straightening vanes" remove corkscrewing airflow components. Non swirling airflow is not important for the generation of dynamic lift but is essential for maximizing static air pressure under the vehicle. Shown in greater detail in FIG. 2 are vanes 200. They are encased between outer shroud 201 and inner shroud 202. In many cases concentric vanes may also be installed.

The operation of all three variations of FIGS. 1A, 1B and 1C is to eject air or gas downwards. This action, in taking still air from above the vehicle and ejecting it downwards causes an upward thrust, or lift, on the vehicle. By Newton's second law of motion this upward force is a result of the change of momentum of the air or gas. Thus the thrust equals the volume of expelled gas times the gas density r times the gas speed V. In foot-pound-second notation the result is in terms of foot pounds per second per second. The equivalent weight lifted is Mg, where M is the Mass supported and g the acceleration due to gravity.

This type of lift, characteristic to helicopters, is not evident in prior art for hovercraft and hovering platforms.

Figure 3:
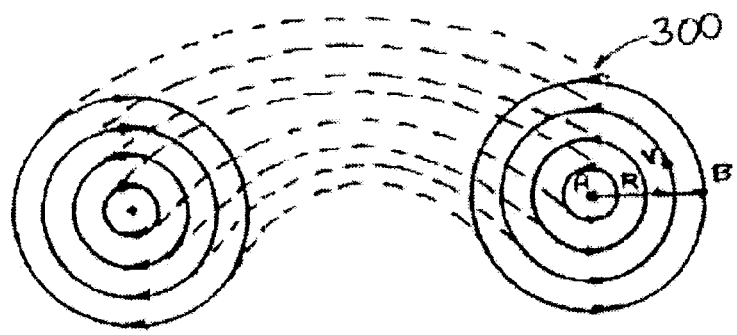
FIG. 3 schematically illustrates a toroidal vortex.

Static pressure is generated by deflecting the downward airflow from between the two shrouds outward to form a partial toroidal vortex. FIG. 3 shows a toroidal vortex. It is most commonly associated with a smoke ring and can be considered as a series of concentric circular air tubes nested one inside the other. The direction of airflow is shown by streamlines 300. The pressure inside each tube is lower than the one in which it is nested. Thus there is a low pressure inside but atmospheric pressure outside. Using the momentum theory of fluid dynamics the pressure across any stream tube taken on the line AB, and radius R with air speed V is given by $\rho V^2/R$ where $\rho$ is the localized pressure. Integrating the pressure differences across all the stream tubes determines the pressure at the center A.

The lifting platform makes use of the pressure profile across a toroidal vortex. In this case the pressure at the center is atmospheric and that on the outside is the internal static pressure of the lifting platform. The high pressure is only present for one quarter of a revolution; for the other three quarters the ambient pressure is atmospheric and so the vortex dissipates, there being no pressure difference between its inside and outside. However, the quarter vortex is sufficient to provide the source of static internal pressure.

Figure 4:
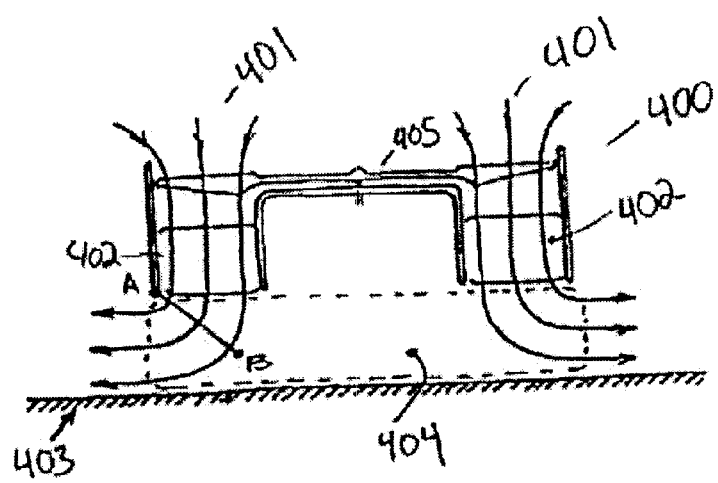
FIG. 4 depicts the development of partial toroidal vortex flow beneath the lifting platform.
Figure 5:
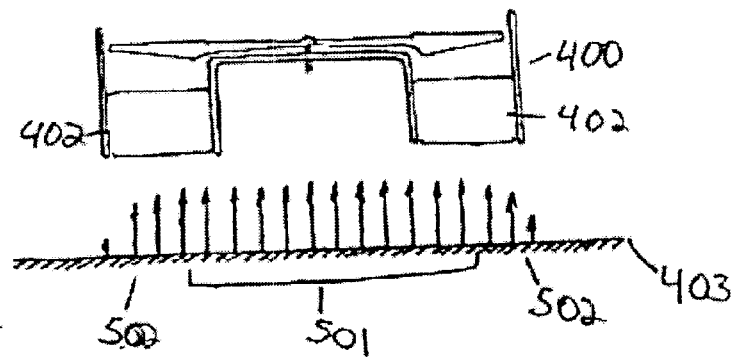
FIG. 5 illustrates the static pressure developed beneath the lifting platform.

FIG. 4 shows the airflow 401 through a lifting platform 400. Air passing vertically downward through the flow straightening vanes 402 via propeller 405 is deflected to the sides by the operating surface 403 and in doing so forms a partial toroidal vortex in region 404 with line AB corresponding to line AB in FIG. 3. FIG. 5 shows the resultant pressure profile beneath lifting platform 400 and operating surface 403. The increased pressure under the central area 501 provides direct lift. The increased pressure to the sides 502 under the flow straightening vanes 402 applies a back pressure to the fan, or propeller 405, shown here, or to a centrifugal pump or jet engine, depending on the configuration. The combination of dynamic and static pressure to support a lifting platform is a novel element of the present invention.

Figure 6:
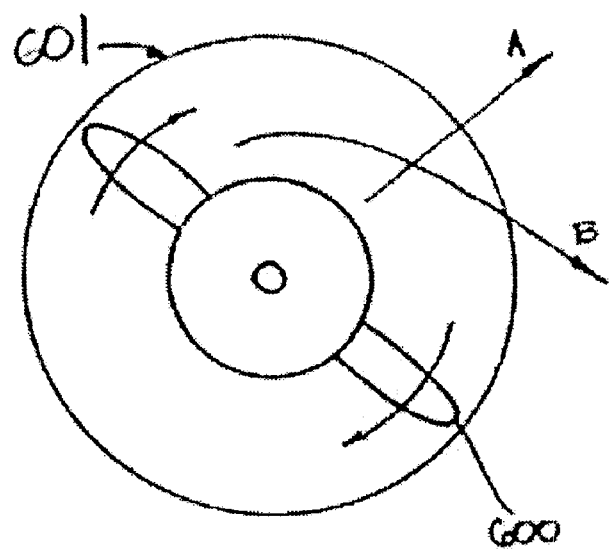
FIG. 6 shows the airflow direction underneath a propeller.
Figure 7:
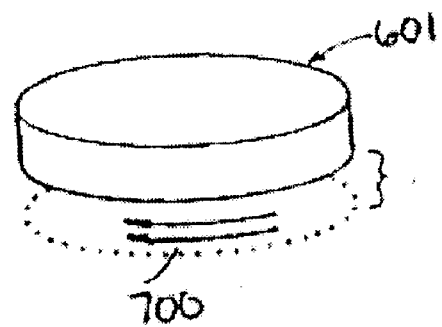
FIG. 7 depicts the formation of a cylindrical vortex.

In order for the static pressure build up to be maximized there must be no corkscrewing motion of the air. FIG. 6 shows a top view of a propeller or fan 600 surrounded by shroud 601 for which the ideal airflow goes downward, into the paper as it were, and is then deflected sideways by the operating surface as shown in vector A. In reality, the air spirals around according to line B, due to the propeller drag, and the effect may be even more pronounced when the power source is a centrifugal pump or jet engine. Referring to FIG. 7, such airflow forms a cylindrical vortex 700 below the outer shroud 601. The effect causes "Vortex Attraction", described in applicant's own co-pending application Ser. No. 09/316,318 filed May 21, 1999, which is herein incorporated by reference, and has the effect of evacuating the space below the central area. The two effects, the toroidal vortex leading to a pressure build up and the cylindrical vortex leading to evacuation superimpose on each other. When there is only a small space between the platform and the operating surface, so that there is little air throughput, and the propeller or fan pitch is set high, the cylindrical vortex predominates and the vehicle is drawn down to the surface. On the other hand, when the spacing between the vehicle and the surface is relatively high, so that there is high air throughput, and the fan or propeller pitch is kept low, the toroidal vortex effect predominates and provides lift.

This deleterious effect is prevented by the insertion of the radial flow straightening vanes, described in FIG. 2, which prevent the formation of a cylindrical vortex and so maximize the static pressure generation. The production of a cylindrical vortex is not mentioned in prior art, although it must be present in many cases because there is no provision to prevent its formation. Thus the inclusion of air flow straightening vanes should be considered an advance in the state of the art.

The description so far has been centered around a lifting platform employing both static and dynamic lift, which could be considered to be more or less equal in value. The static pressure development is inversely proportional to the height of the inner shroud above the operating surface. Such a vehicle is intended for operation at heights that are not greater than the diameter of the inner shroud, where the proportion of lift provided by static pressure begins to become small when compared with the dynamic lift provided by the propeller fan or jet engine.

The operational height of this configuration is greater than that of a hovercraft, which relies solely on static pressure to provide lift. When hovering at a height of a few feet above the ground, the power requirement is somewhat greater than that for a hovercraft with an efficient skirt at a height of a few inches, but far less than that for a helicopter hovering at the same height; the helicopter has no central static pressure lift zone. The lifting platform, therefore, fills the gap between hovercraft and helicopter operation and as such is not described in prior art. One application of the hovering platform is operation over rough terrain that is inaccessible to hovercraft or road or track vehicles. An example of such operation is in the Arctic where hovercraft operation is limited by ice ridges in the ice pack. Another application is as an aerial crane, or lifting vehicle, that is able to operate over rough terrain but consumes less power than a helicopter and the terrain is unsuitable for a hovercraft. Such a vehicle would appear well suited to mine detection due to its ability to travel over rough surfaces without applying sufficient pressure to trigger a mine's detonator.

Varying the proportions of the dynamic lift area, i.e. the area between the inner and outer shrouds, and the static lift area, i.e. that under the inner shroud, provides a variety of operating characteristics for different applications.

Figure 8:
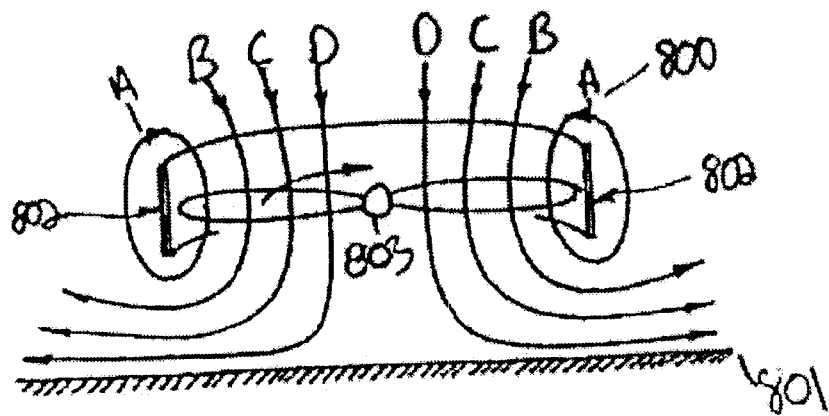
FIG. 8 (PRIOR ART) illustrates a ducted fan operating over a horizontal. surface.
Figure 9:
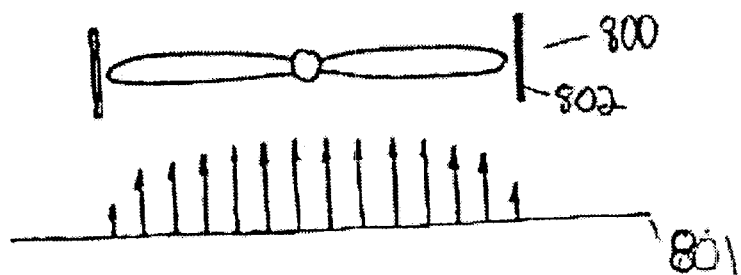
FIG. 9 (PRIOR ART) illustrates the pressure distribution below a ducted fan.

The ducted fan has been in use for the past 100 years or so to propel land and sea vehicles, and aircraft. It has been used extensively in the development of vertical takeoff and landing aircraft for which it is oriented to blow air down vertically for takeoff and landing and horizontally for horizontal flight. FIG. 8 shows a ducted fan 800 operating close to a flat surface 801. Here there is just one shroud 802 , or duct, equivalent to the outer shroud in the previous descriptions. The ducted fan comprises a propellor 803 circumferentially surrounded by a the shroud 802. The propeller blade tip vortex, A, is restricted to the very tip of the blade and the magnitude depends on the depth of the shroud 802. The stream lines A,B,C,D clearly show the cross section of the partial toroidal vortex set up by the ducted fan 800. The pressure profile, shown in FIG. 9, shows a fairly even pressure build up beneath the fan 800 due to air being deflected sideways by the flat surface 801. This action, although it is not described as such, is due to the formation of a partial toroidal vortex. Such pressure increase, called back pressure, improves the propeller efficiency by reducing the downwash angle and drag and bringing the resultant lift force closer to the vertical. Of course the propeller pitch has to be set correctly to maximize the effect. The arrangement suffers, as in the earlier description, by air corkscrewing or spiraling downwards rather than moving vertically down. Thus the back pressure is limited by the formation of a cylindrical vortex beneath the shroud 802 which reduces and may even eliminate the back pressure.

Figure 10:
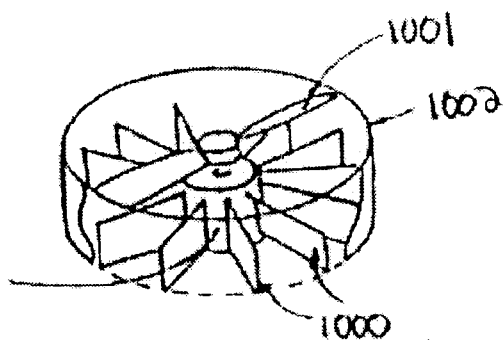
FIG. 10 depicts the addition of flow straightening vanes to a ducted fan.

In order to make the ducted fan into an efficient lifting platform, when located close to the ground it must be fitted with flow straightening vanes 1000 as shown in FIG. 10. Propeller 1001 and vanes 1000 are encased by shroud 1002. If lateral movement is desired, vanes 1000 may be deflected from the vertical axis to generate a lateral component in the downward airflow. As a result of such deflection, static pressure is reduced by an amount equal to the cosine of the angle to the vertical while a horizontal force is produced which is proportional to the sine of the same angle. Since small angular deviations from the vertical cause only a slight variation in the cosine of the angle while the sine of the angle increases rapidly, a considerable horizontal force may be generated while the loss in lifting force remains negligible. For example, deflecting the vanes ten degrees from the vertical axis reduces the vertical velocity component by one-and-a-half percent but results in a horizontal component that is seventeen percent of the vertical.

To provide adequate control of lateral movement, vanes 1000 should be deflected such that the angle of a vane 1000 corresponds to the angle of another vane 1000 across from it. For example, to establish a forward thrust some vanes 1000 on either side must be deflected by the same amount to provide a backward airstream. For reverse thrust some vanes 1000 on either side must be deflected by the same amount to provide a forward airstream. For sideways thrust vanes 1000 on the front and back must be deflected by the same amount to generate a sideways airflow. Vanes 1000 may also be deflected in opposite directions in order to turn the apparatus, however, the amount of airflow deviation from the vertical is limited because such flow forms a cylindrical vortex that will decrease the static pressure.

Figures 11A, 11B:
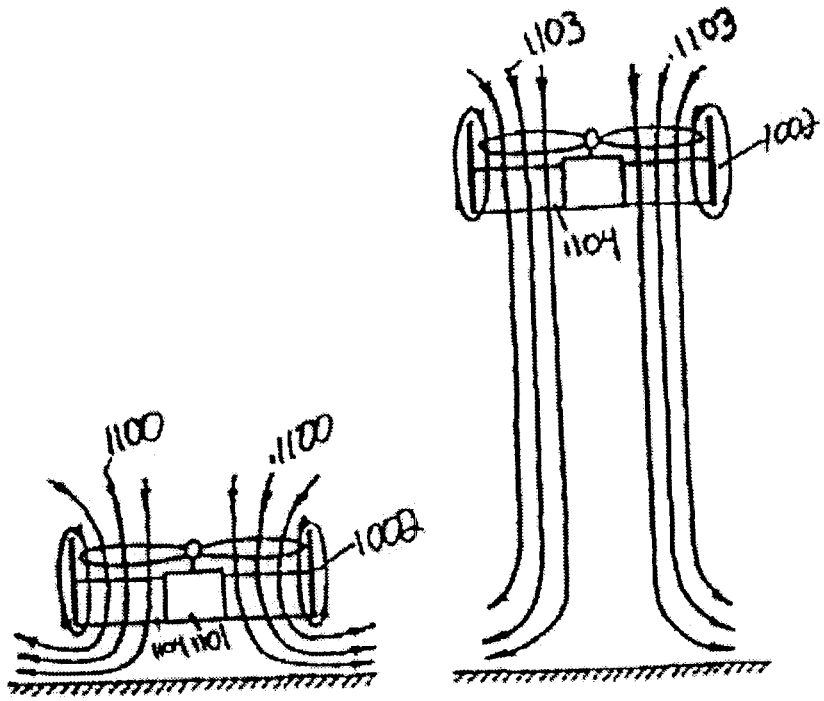
FIG. 11A depicts airflow with a ducted fan close to a flat surface.
FIG. 11B depicts airflow with a ducted fan high above a flat surface.

FIG. 1A shows the airflow around a ducted fan with flow vanes 1104 close to the ground, and in FIG. 11B, at altitude. When close to the ground in FIG. 11A, the deflection of the airflow below the shroud 1002 generates a back pressure that increases both lift and efficiency. The motor mounting 1101 provides a small area in the center for the static pressure to act. As with the previously described case there are three forms of lift. The first is due to the downward momentum of air providing lift as a reactionary force. The second is the outward deflection of the air into a partial toroidal vortex which provides a back pressure or ground effect that increases the lift and efficiency of the propeller, and the third is the static upward pressure against the engine mounting. As before, flow-straightening vanes 1104 may be deflected accordingly if lateral movement is desired.

Figure 12:
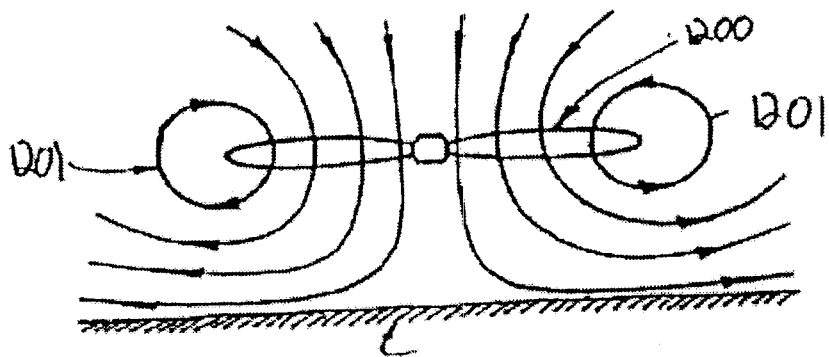
FIG. 12 (PRIOR ART) illustrates the airflow around a propellor spinning above a horizontal surface.

Referring to FIG. 11B, when in flight, there is no outward curving of the air flow 1103 close to the shroud 1002. The lift in this case is produced solely by the rate of change of air momentum through the propeller. It is interesting to note that when operating high above the surface the platform is more efficient than a helicopter because the shroud minimizes propeller tip vortices. FIG. 12 shows the tip vortices 1201 generated by a propeller 1200 or helicopter rotor. They limit the amount of air blown downward at the tip and absorb power. A flying ducted fan is, therefore, fundamentally more efficient than a helicopter, and the efficiency is greatly enhanced when operating close to the ground because the partial toroidal vortex produced within the shroud is more intense, and the back pressure greater than the unshrouded rotor.

Unfortunately, the ducted fan is less suited to horizontal flight than a helicopter, it has a large side area, so it cannot replace a helicopter where fast travel is required. However, for applications where a high horizontal speed is not required, such as in a sky crane, or in a mine detecting application, the ducted fan with flow straightening vanes is superior.

The addition of radial flow vanes to ducted fans on vertical takeoff and landing aircraft permits an improved performance close to the ground in that not only is the lift increased but the rapid increase in lift as the proximity to the ground decreases adds vertical stability to the control. Whereas the ducted fan has been in use for a long period the addition of flow straightening vanes, which appreciably improves the versatility, as shown above, has not.

Figure 13:
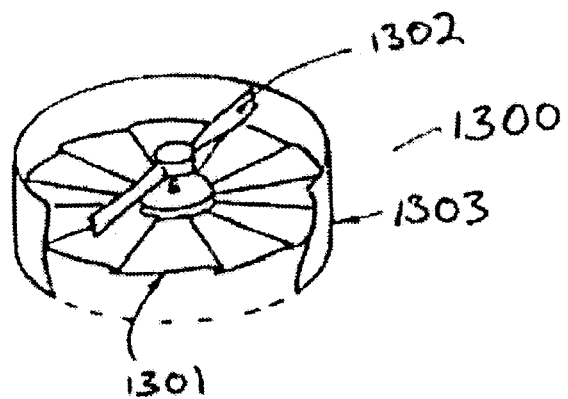
FIG. 13 illustrates the conversion of a lifting platform to a vortex attractor.

Referring to FIG. 13, the ducted fan configuration of FIG. 10 may be simply converted to a Vortex Attractor 1300 by swinging around the flow straightening vanes 1301, as shown in FIG. 13, and feathering the propeller blades 1302. Again, the blades are surrounded by shroud 1303. In such a mode it will be attracted to a ceiling or other reasonably flat horizontal surface, and may be driven around on wheels (not shown). The operating sequence would be to fly up to the ceiling configured as in FIG. 10, rotate the flow vanes 1301 as in FIG. 13 and then feather the propeller blades 1302. The power required to hold to the ceiling is approximately one tenth of the power required to fly. Applications for this mode include surveillance and inspection of difficult to access horizontal surfaces.

Figure 14:
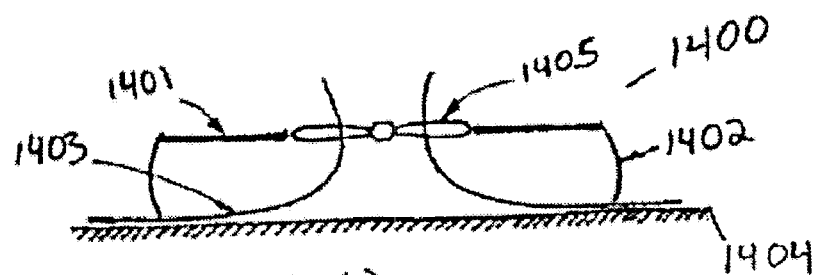
FIG. 14 (PRIOR ART) depicts a typical hovercraft.

A typical prior art hovercraft 1400 is shown in FIG. 14. It comprised of a deck 1401 surrounded by a flexible skirt 1402. Air 1403 is blown in from the top via propeller 1405 to establish a high pressure zone within the skirt 1402 to lift the hovercraft 1400 upward. The skirt 1402 forms an imperfect seal to the operating surface 1404. Any non-uniformities in the surface 1404, such as stones in a road, or waves in water, allow air 1403 to escape under the skirt 1402. The diagram shows that air 1403 blowing in from the top is deflected by the working surface 1404 and passes out horizontally under the skirt 1402. In this case there is no surrounding toroidal vortex formation to form a pressure barrier to limit the air escape.

Changing the configuration of the conventional hovercraft to the system 1400 of FIG. 14, the air 1501 is blown down a hollow skirt 1502 via blower 1503. The operation is now similar to that of FIG. 1 in which a partial toroidal vortex 1506 is formed along the edge of the skirt 1502 to maintain a high pressure under the platform 1504. There is no need to blow air into the center space 1505, the pressure automatically rises to that determined by the velocity and radius of curvature of the air 1501 as it changes its direction from vertical, in the air duct 1507 of the hollow skirt 1502, to horizontal as it passes out sideways. The skirt 1502 must have vertical vanes (not shown) to prevent horizontal circulation unless lateral movement is desired. In such a case said vertical vanes may be deflected accordingly for this purpose. Blowing the air downward at the edge of the craft requires less power to maintain lifting pressure. In this case the majority of the lift is provided by the static pressure within the inner shroud and very little dynamic lift is generated. Hovercraft have been made with double skirts with air blowing down between them, although these do not seem to have found much commercial success. The arrangement of the present invention depicted in FIG. 15 differs in that it includes flow straightening vanes to maximize partial toroidal vortex formation and consequently the inner static pressure.

Figure 16:
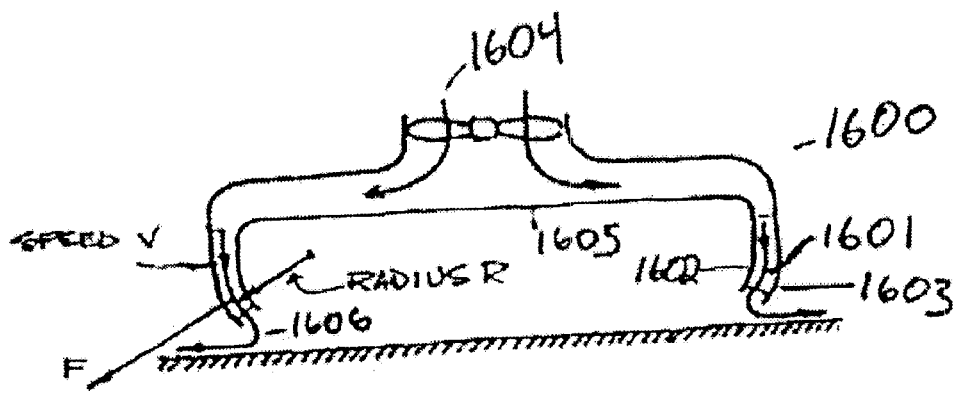
FIG. 16 illustrates a hovercraft wherein the hollow skirt is turned inwards to increase internal pressure.

Referring to FIG. 16, a lifting platform 1600 is shown wherein the duct 1601 between the inner 1602 and outer 1603 shrouds may be curved as shown (with radius of curvature R) in order to inject the moving air 1604 at an angle under the platform 1605. The flow would be as illustrated by streamline 1606, having a velocity V. This is a technique commonly used in hovercraft and first patented by Christopher Cockerell in the 1960's, as a way to increase the pressure beneath the craft. When air is injected at an angle the air has to turn through a smaller angle to escape outward and the interior pressure is raised accordingly. There is a downside to doing this, however, for in curving the downward flowing air inward its momentum is changed. The resultant force F equals the rate of change of momentum of the air; it has a downward component that cancels some of the upward lift due to the pressure beneath the platform. In other words, the dynamic lift effect is reduced in order to maximize the static pressure. As the dynamic lift is not claimed as a feature, and is sacrificed for static pressure, a hovercraft may be seen as a wholly static pressure device. Hovercraft are limited to operating a matter of inches above a ground or water surface. As such they represent one end point in the new lifting platform development; the point at which dynamic lift generation is too small to be relevant. It is curious that the fifty years of hovercraft design has ignored the dynamic lift generation that is fundamental to the new development and essential if a platform is to rise high off the ground.

Figure 15:
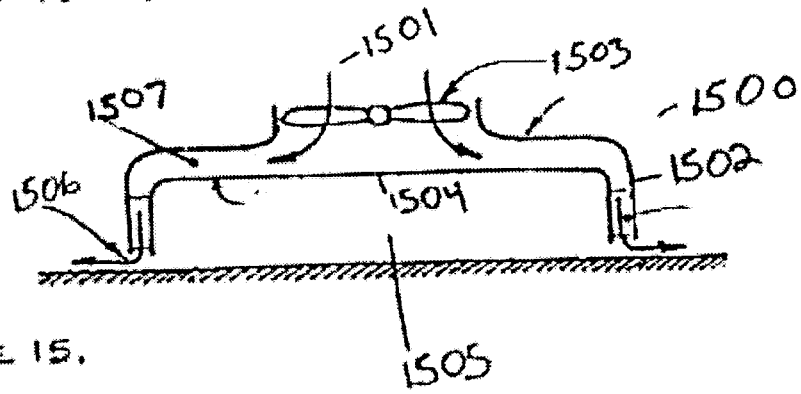
FIG. 15 depicts a modification to a typical hovercraft to blow air vertically down a hollow skirt.

The system 1500 of FIG. 15 becomes a hovering platform within the boundaries of this description, when the relative areas between the inner and outer shrouds and the area beneath the inner shrouds are adjusted, in order to permit dynamic lift generation by the downward airflow to become a substantial part of the lifting force. Then, by increasing the power, the platform may be lifted sufficiently to clear obstacles. A conventional hovercraft, however, is unable to do this.

The hovering platform of FIG. 15 is not best served with a propeller as the air mover. A propeller or fan does not operate well when passing a small amount of air into a high back pressure, the conditions for efficient lift generation with the platform operating close to a flat surface. A more efficient air mover under these conditions is the centrifugal blower of the type used in vacuum cleaners. It is common knowledge that blocking up a vacuum cleaner hose takes the load off the motor and allows it to speed up. This is because the circulating air within the blades adjusts to the output pressure, it prevents new air from moving in and does not waste power in air circulation around the blades. When the platform is close to the ground, and there is little air throughput, the centrifugal pump consumes little power.

Figure 17:
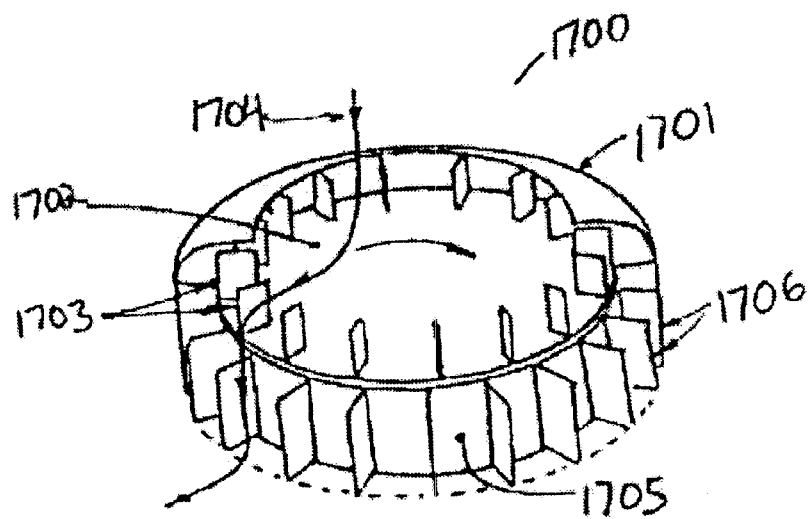
FIG. 17 depicts a lifting platform utilizing a centrifugal air pump.

FIG. 17 shows an arrangement 1700 with a centrifugal air pump comprising spinning hub 1702 and blades 1703 attached thereto sitting within the outer shroud 1701 (shown cutaway). Incoming air follows streamline 1704, wherein it enters from above and is blown sideways into the space between the inner 1705 and outer shroud 1701 and then downwards through flow straightening vanes 1706. As before, flow-straightening vanes 1706 may be deflected if lateral movement is desired. Impeller blades 1703 may also be deflected with similar results. It should be noted, however, that in this case the air pump impeller does not provide any lift. The propellers in the preceding figures all generate lift independently, and increasing amounts of lift as the platform approaches the flat surface and the back pressure increases. Lift is provided, however, as the horizontal airflow through the impeller blades 1703 turns downward between the inner shroud 1705 and outer shroud 1701. This lift is equal to the rate of change of momentum of the air from horizontal to vertical. The centrifugal blower approach is very efficient when the platform is close to the working surface, the air throughput is low and the pressure below the central area is high. The lifting platform with a centrifugal air pump operates efficiently in the hovercraft realm, and also for rising above obstacles for which the centrifugal pump airflow is able to generate sufficient dynamic lift.

Figure 18:
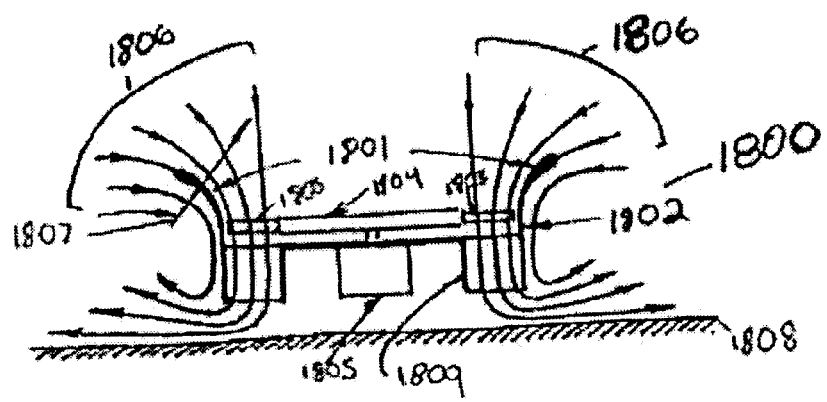
FIG. 18 depicts the addition of an extended lip to gain lift from incoming air flow.

FIG. 18 shows an expanded hub ducted fan 1800 comprising an extended lip 1801 on the outer shroud 1802 which acts as an airfoil to air 1806 flowing into the propeller blades 1803 and through flow straightening vanes 1809. The device 1800 is optimally operated close to the horizontal surface 1808. Propeller blades 1803 are mounted to hub 1804, which is driven by motor 1805. The resultant force, represented by vector 1807, due to air 1806 flowing into the outer edge of the propeller 1803 has a vertical component which aids in lifting the device 1800. Such airfoil sectioned lips have been commonly applied to ducted fans, but never before to a lifting platform application.

Figure 19:
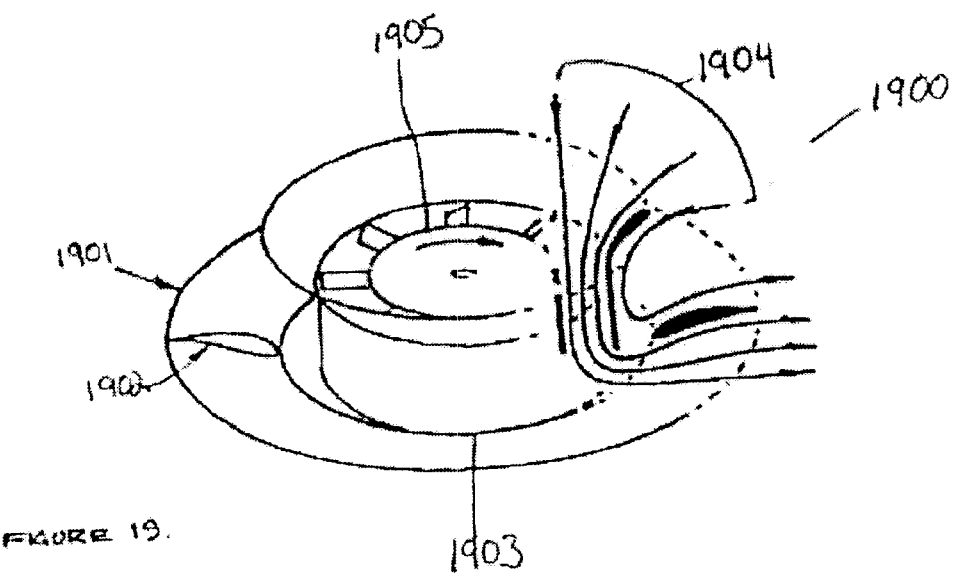
FIG. 19 illustrates the addition of an outer lip to gain lift from air outflow.

When the lifting platform is flying, or set high above a flat surface the airflow is as shown in FIG. 11B with air exiting vertically downwards, energy cannot be gained from this outflow. However, when the platform is operating close to a flat surface, as in FIG. 11A, air passing through the blade tip region leaves the outer shroud with a slightly upward angle and so energy may be retrieved by a device located above the level of the bottom of the shroud. This effect is enhanced when the outer shroud has an upper lip as in FIG. 18. In addition to air passing through the propeller, venturi action draws air down the outside of the shroud to exit with an upward tilt. The device 1900 of FIG. 19 builds upon this idea by adding an additional annular wing 1901 having wing section 1902. Placement of this additional annular wing 1901 is such that it derives lift from airflow that is above the level of the bottom of the shroud 1903. Streamlines 1904 illustrate the airflow. The overall ducted fan mechanism 1905 is identical to that of FIG. 18, with the addition of annular wing 1901.

All of the lifting platforms in these notes have been shown as circular. This is convenient for systems with propellers or centrifugal pumps but is in no way essential to the operation. Most shapes can be accommodated, and systems with multiple fans, rotors or jets will operate just as the single air movers systems described.

Aircraft jet engines are designed to operate efficiently when moving horizontally at flying speed. They may be designed to sacrifice some flying speed in order to generate high thrust while stationary on the ground. There are difficulties though when a jet engine operates vertically close to the ground blowing gas directly downwards for vertical take off.

The present invention does not propose any alteration of the engines characteristics, rather they intend to show an approach to increase the available thrust when close to the ground and to produce a characteristic that has increasing thrust with decreasing distance to the ground.

Referring to FIG. 20, a stationary, horizontally mounted jet engine 2000 is illustrated. Such an engine 2000 develops thrust by intake of a low speed flow of gas 2001 and rejecting a high speed flow of gas 2002. Such a situation lends itself to analysis by momentum theory. Momentum theory shows that the thrust generated by engine 2000 to be equal to the rate of change of momentum of the gases 2001 to 2002. With the engine 2000 sitting in sill air, the thrust equals the mass of air ejected 2002 per second multiplied by the speed of the gas 2002. Thus result is, of course, in terms of mass times acceleration ($\int P\ dt=M*a$).

This situation is analogous when the engine 2000 operates vertically, such as in FIG. 21A, with the intake of gas 2101 at the top. Here, again, the thrust equals the mass of gas ejected 2100 per second multiplied by the speed V of the gas 2100. When used to lift an aircraft, for example, this rate of change of momentum is made equal to the mass of the aircraft multiplied by the acceleration due to gravity (9.8 m/s$^2$ or 32.17 ft/s$^2$). The ejected gas 2100 is prevented from continuing in a straight fashion by the ground 2102, and instead, has to curve outward to the sides. Such a curvature leads to the establishment of a high pressure area beneath the engine 2000 which can be calculated knowing the speed V and radius of curvature R of each stream tube 2104. The pressure difference across the stream tube is $\rho V^2/R$ where "$\rho$" is the gas density. Integrating all stream tubes leads to FIG. 21B. Here, beneath engine 2000, is the representative pressure profile 2105. Note the maximum at the center, and drastic reduction at the edges.

The back pressure, as this is generally called, is an advantage to a helicopter for which the blade lift is increased and drag decreased. Operation close to the ground is stable because the lift increases as the height decreases. Such is not the case for a jet engine because the back pressure upsets its efficiency. The blades on the power turbine are set for efficient operation with high gas flow at low pressure. They are not designed to deliver gas into a high pressure. Making things more difficult, turbines do not have variable pitch blades.

The present invention comprises a new approach to a lifting platform in which the central area of high pressure, as in FIG. 21B, is extended to provide lift while the pressure is maintained by high speed air flow around the periphery. FIGS. 22A, 22B and 22C show a possible extension of the technique to enhance a jet engine thrust when close to the ground. The basic arrangement 2200 in FIG. 22A has a double shroud system comprising outer shroud 2201 and inner shroud 2202 to spread the output gas 2203 from jet engine 2000 over an inner shroud 2202 and then vertically downwards. An outer shroud 2201 completes the gas duct. Vanes, not shown, are fitted between the inner 2202 and outer 2201 shrouds to ensure that the gas 2203 leaving the system 2200 travels vertically downwards. These vanes may also be steerable for control purposes, i.e., lateral motion..

Referring to FIG. 21B, when air leaves the shrouds 2201, 2202 from jet engine 2000, it is directed sideways by the ground surface 2204. As before, the pressure in the inner "lift area" 2205 is determined by integrating $\rho V^2/R$ for all the stream tubes 2206 turning from vertical to horizontal. The pressure at the outside edges of the inner shroud 2202 is maintained across the central area. The ground effect lets you have it for free. The air curving out from between the inner and outer shrouds forms a partial toroidal vortex. The pressure derivations are as for a complete toroidal vortex with ambient pressure in the core. This system is therefore termed Vortex Lift.

Referring last to FIG. 22C, with the present arrangement 2200, the bulk of the lift is derived from the high pressure area 2207 beneath the inner shroud 2202. The system also allows the gas leaving the jet engine to expand across the top of the inner shroud 2202 thus reducing the back pressure acting on it and increasing its efficiency. Therefore, the system design balances engine characteristics against pressure in the central area. The central pressure is inversely proportional to the distance from the ground 2204. This means that the lift increases with proximity to the ground, a stable behavior.

This lift system 2200 only works when the aircraft is close to the ground and has no effect at altitude. Whereas the jet ports on the Harrier swivel when changing from vertical to horizontal propulsion, the shrouds in this system would be a huge drag when swiveled for forward thrust. It may be that a compromising system can be made retractable. Another approach is to use the entire central fuselage-wing root area as the central lift area and direct high speed gases through a continuous series of nozzles around this area. As the central area lift effect is still considerable when the height above the ground equals the outer ring diameter such an arrangement could provide lift enhancement to a height of 10 to 15 feet.

Figure 23:
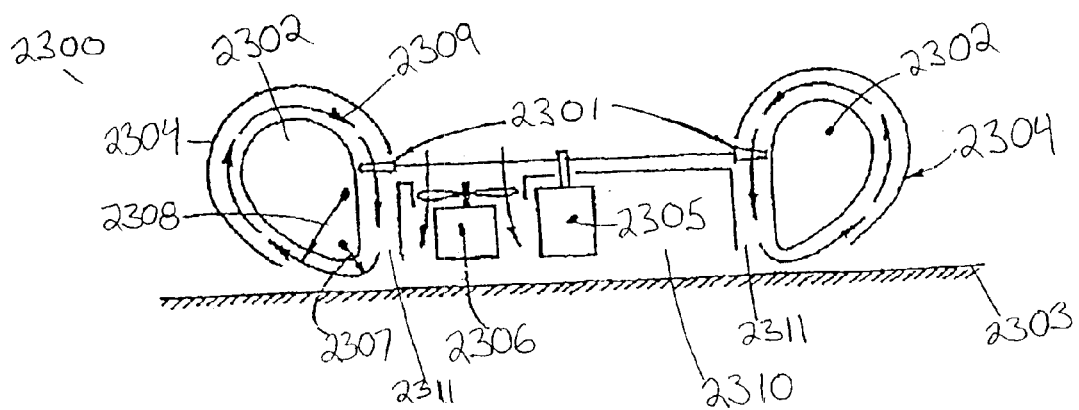
FIG. 23 depicts a lifting platform with energy recovery.

FIG. 23 depicts a cut-away view of a lifting platform 2300 in which the toroidal vortex (which was incomplete in prior embodiments) that sustains the lifting platform, is made complete. The toroidal vortex is formed around a "donut" 2302 in much the same way as the inventor's previously described toroidal vortex attractors. The only distinction is that, in this case, the air flow direction is reversed—the air goes downward at the center of the donut and upwards around the outside within an outer shroud 2304. The outer shroud 2304 is extended to wrap around the donut 2302. In this system, the internal pressure is not necessarily provided by the vortex, but by an optional additional fan and motor 2306. Fan and motor 2306 can be used to develop the required pressure within and under the inner shroud 2311.

The airflow is effected by motor 2305 coupled to vortex fan blades 2301. The air moving downwards with a velocity V (shown by streamline 2309) at the center of the donut 2302 is pushed sideways at the bottom and turns sideways with a radius of curvature R1 (shown by 2307). The pressure differential between the central area 2310 and the donut 2302 is thus $\varrho V^2/R1$, in which $\varrho$ is the air density, V is the air speed 2309 around the donut 2302, and R1 is the radius of the air curving outward. The air moving sideways and outward is pulled up into the duct between the donut 2302 and the outer shroud 2304. It is also pushed up by atmospheric pressure. The pressure difference between atmospheric and the pressure around the donut 2302 is $\varrho V2/R2$, in which $\varrho$ is the air density, V is the air speed 2309 around the donut 2302, and R2 is the radius of curvature 2308 between the donut 2302 and the atmosphere. When 2307 (R1) is smaller than 2308 (R2), the central pressure under the inner shroud 2311 is greater than atmospheric, the ratio of pressures being 2308/2307 (R2/R1).

In order for the system 2300 to operate correctly and be able to support lift above surface 2303, the airflow passing downwards between the inside of the donut 2302 and the inner shroud 2311 has to be made vertical by inserting flow straightening vanes (not shown) in order to prevent cylindrical vortex effects that tend to throw air out sideways.

In this system 2300, the air continuously cycles around the donut 2302 so that the prime function of the motor 2305 and vortex fan blades 2301 is to replace energy losses due to friction. Recycling the air minimizes the disturbance to the surroundings due to laterally ejected air of prior lifting platforms. The optional pressure fan 2306 are contemplated to provide independent control of the central pressure and vortex airspeed. The pressure fan 2306 is not essential to the lifting function.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

I claim:

1. A lifting platform comprising:
   flow means for generating a fluid flow having a rotational component and tangential component, said tangential component directed toward a surface;
   straightening means for substantially eliminating said rotational component of said fluid flow;
   platform structure for arranging said flow means and said straightening means such that said fluid flow travels through said straightening means, toward said surface;
   torus structure, coupled to said straightening means, circumferentially surrounding said platform structure, said torus structure having an outer peripheral channel in which said fluid flow travels, said channel having an opening in the substantial vicinity of said surface;
   wherein said fluid flow, having flowed through said channel of said torus structure creates a complete toroidal vortex surrounding said platform structure and thereby efficiently generating lift.

2. A lifting platform according to claim 1 further comprising pressure fan means disposed with in said platform structure for generating a fluid flow toward said surface to provide independent control of pressure and velocity of said fluid flow.

3. A lifting platform according to claim 1 wherein said flow means comprise:

motor means for generating a torque; and
fan blades coupled to said motor means.

4. A lifting platform according to claim 1 wherein said flow means comprise:
   motor means for generating a torque; and
   propeller blades coupled to said motor means.

5. A lifting platform according to claim 1 wherein said platform structure has a circular plan form.

6. A lifting platform according to claim 1 wherein said platform structure has an elliptical plan form.

7. A lifting platform according to claim 1 wherein said platform structure has a polygonal plan form.

8. A lifting platform according to claim 1 wherein said platform structure has a rectangular plan form.

9. A lifting platform according to claim 1 wherein said torus structure has a circular cross section.

10. A lifting platform according to claim 1 wherein said torus structure has an eccentric cross-section, comprising two radii of curvature, the first said radius of curvature between said surface and said platform structure, the second said radius of curvature between said surface and the surrounding atmosphere.

11. A lifting platform according to claim 10 wherein said first radius of curvature is less than said second radius of curvature.

12. A lifting platform according to claim 1 wherein said straightening means comprise members aligned with said tangential component of said fluid flow.

13. A method for creating a lifting force comprising the steps of:
   providing a fluid flow having a rotational component and a tangential component, said tangential component directed toward a surface;
   eliminating said rotational component of said fluid flow; and
   guiding said fluid flow such that it generates a complete toroidal vortex flow;
   wherein the interaction of said complete toroidal vortex flow and said surface generate a positive pressure region thereby producing said lifting force.

14. A method according to claim 13 wherein said step of providing a fluid flow is accomplished by providing a motor means coupled to fan blade means.

15. A method according to claim 13 wherein said step of providing a fluid flow is accomplished by providing a motor means coupled to propeller blade means.

16. A method according to claim 13 wherein said step of eliminating is accomplished by providing flow straightening vanes through which said fluid flow flows.

17. A method according to claim 13 wherein said step of guiding is accomplished by providing a torus structure having an outer peripheral channel in which said fluid flow travels, said channel having an opening in the substantial vicinity of said surface.

* * * * *